US009167245B2

(12) United States Patent
Lou et al.

(10) Patent No.: US 9,167,245 B2
(45) Date of Patent: Oct. 20, 2015

(54) METHOD OF DETERMINING BINARY CODEWORDS FOR TRANSFORM COEFFICIENTS

(71) Applicant: Google Technology Holdings LLC, Mountain View, CA (US)

(72) Inventors: Jian Lou, San Diego, CA (US); Limin Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 446 days.

(21) Appl. No.: 13/759,764

(22) Filed: Feb. 5, 2013

(65) Prior Publication Data

US 2013/0202029 A1 Aug. 8, 2013

Related U.S. Application Data

(60) Provisional application No. 61/595,134, filed on Feb. 5, 2012, provisional application No. 61/595,153, filed on Feb. 6, 2012.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/129* | (2014.01) |

(Continued)

(52) U.S. Cl.
CPC ....... *H04N 19/00109* (2013.01); *H04N 19/129* (2014.11); *H04N 19/91* (2014.11); *H04N 19/13* (2014.11); *H04N 19/96* (2014.11)

(58) Field of Classification Search
None
See application file for complete search history.

(56) References Cited

U.S. PATENT DOCUMENTS 6,014,095 A * 1/2000 Yokoyama ...................... 341/67
2005/0123207 A1 6/2005 Marpe et al.
(Continued)

FOREIGN PATENT DOCUMENTS

| WO | WO2008153270 | 12/2008 |
|---|---|---|
| WO | WO2012095488 | 7/2012 |

OTHER PUBLICATIONS

Auyeung, et al.; Context Reduction of Significance Map Coding With CABAC; JCTVC-G1015; 7th Meeting: Geneva, CH, Nov. 21-30, 2011.

(Continued)

*Primary Examiner* — Joseph Ustaris
*Assistant Examiner* — Talha Nawaz
(74) *Attorney, Agent, or Firm* — Young Basile Hanlon & MacFarlane P.C.

(57) ABSTRACT

A system is provided for creating binary codewords for transform coefficients used for relating transform units (TUs) divided into coding units (CUs) in a High Efficiency Video Coding (HEVC) system. The system provides binarization of the codewords and removes unnecessary operations to reduce system complexity and increase compression performance. The system generates transform coefficients that relate the TUs and begins by providing a parameter variable (cRice-Param) set to an initial value of zero. Significant transform coefficients are converted into binary codewords based on the current value of the parameter variable, and the parameter variable is then updated with a new current value after each transform coefficient has been converted. Updating can be provided with reference to table values or the values can be provided from combination logic.

17 Claims, 19 Drawing Sheets

(51) Int. Cl.
*H04N 19/91* (2014.01)
*H04N 19/13* (2014.01)
*H04N 19/96* (2014.01)

(56) References Cited

U.S. PATENT DOCUMENTS

| | | | |
|---|---|---|---|
| 2008/0013633 A1 | 1/2008 | Ye et al. | |
| 2008/0310503 A1* | 12/2008 | Lee et al. | 375/240.2 |
| 2012/0128067 A1* | 5/2012 | Liu et al. | 375/240.12 |
| 2012/0300839 A1* | 11/2012 | Sze et al. | 375/240.12 |
| 2012/0307894 A1* | 12/2012 | Chien et al. | 375/240.12 |
| 2013/0003840 A1* | 1/2013 | Gao et al. | 375/240.12 |
| 2013/0003858 A1* | 1/2013 | Sze | 375/240.18 |
| 2013/0016789 A1 | 1/2013 | Lou et al. | |
| 2013/0114698 A1 | 5/2013 | Lou et al. | |
| 2013/0188694 A1 | 7/2013 | Lou et al. | |
| 2013/0188698 A1* | 7/2013 | Chien et al. | 375/240.12 |
| 2013/0188727 A1 | 7/2013 | Lou et al. | |
| 2013/0188729 A1 | 7/2013 | Lou et al. | |
| 2013/0195182 A1 | 8/2013 | Kung et al. | |
| 2013/0202026 A1 | 8/2013 | Fang et al. | |
| 2013/0322547 A1 | 12/2013 | Lou et al. | |
| 2014/0056356 A1* | 2/2014 | Yu et al. | 375/240.16 |

OTHER PUBLICATIONS

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.

Guo L. et al.: "CABAC Contexts Reduction for Last Position Coding", 8. JCT-VC Meeting; 99 MPEG Meeting; Jan. 2, 2012 Oct. 2, 2012; San Jose; (Joint Collaborative Team on Video Coding of ISO/IEC JTC1/SC29/WG11 and ITU-T-SG. 16); URL:http://wftp3.itu.int/av-arch/jctvc-site/,, No. JCTVC-H)537, Jan. 21, 2012, all pages.

Heising et al., "CABAC and ABT" Joint Video Team (JVT) of ISO/IEC MEPG & ITU-T VCEG (ISO/IEC JTC1/SC29/W1 and ITU-T SG16 Q.6) 4th Meeting: Klagenfurt, Austria; Jul. 22-26, 2002; 14 pages.

ISR, "ISR Search Report and Written Opinion of the International Searching Authority" for International Application No. ISR/US2012/046960 dated Feb. 25, 2013, 19 pages.

ISR, "ISR Search Report and Written Opinion of the International Searching Authority" for International Application No. ISR/US2012/064229 dated Feb. 4, 2014, 1220 pages.

ISR, "ISR Search Report and Written Opinion of the International Searching Authority" for International Application No. ISR/US2013/022306 dated Mar. 28, 2013, 14 pages.

ISR, "ISR Search Report and Written Opinion of the International Searching Authority" for International Application No. ISR/US2013/022312 dated 2013 Apr. 2013, 14 pages.

ISR, & Written Opinion of the International Searching Authority for International Application No. ISR/US2013/024654, May 7, 2013, 11 pages.

Kurcerin et al., "Improvements on CABAC" ITU-Telecommunications Standardization Sector; Study Group 16 Question 6; Video Coding Experts Group (VCEG) 14th Meeting: Santa Barbara, CA, USA; Sep. 24-27, 2001; 6 pages.

Malvar HS: "Adaptive run-length/Golomb-Rice encoding of quantized generalized Gaussian sources with unknown statistics," Proceddings, DCC 2006, Data Compression Conference, Mar. 28, 2006-Mar. 30, 2006, all pages, IEEE Compt. Society Los Alamitos, CA USA.

Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.

Wien, Mathias "Variable Block-Size Transforms for Hybrid Video Coding" Dissertation Der Rheinisch-Westfaelischen Technischen Hochschule Aachen; Aachen, Germany; Feb. 3, 2004; 184 pages.

Nguyen (Fraunhofer HHI)T: "CE:11 Coding of Transform Coefficient Levels with Golomb-Rice codes," Mar. 10, 2011, all pages.

Nguyen et al., "Proposed Cleanup for Transform Coefficient Coding," Joint Collaborative Team on Video Coding JCTVC-H0228, Feb. 1, 2012.

Nguyen T et al.: "Reduced-complexity entropy coding of transform coefficient labels using a combination of VLC and PIPE," 4. JCT/VC Meeting; 95. Mpeg Meeting; Jan. 20, 2011-Jan. 28, 2011; Daegu; (Joint Collaborative Team on Video Coding of ISO/IEC JTC1/SC29/WG11 and ITU-T SG16); URL: http://wftp3.itu.int/av-arch/jctvc-site/. No. JCTVC-D336, Jan. 16, 2011 all pages.

Nguyen, et al.; Multi-Level Significance Maps for Large Transform Units; JCTVC-G644; 7th Meeting: Geneva, Nov. 21-30, 2011.

Office Action mailed Dec. 18, 2014 in co-pending Japanese Application.

Sole et al., "Unified scans for the significance map and coefficient level coding in high coding efficiency," Joint Collaborative Team on Video Coding, JCTVCF-288 Geneva, Jul. 8, 2011.

Sole, et al.; Non-CE11: Diagonal Sub-Block Scan for the Residual Coding; JCTVC-G323; 7th Meeting: Geneva, CH, Nov. 21-30, 2011.

Sze, "Reduction in contexts used for significant coeff_flag and coefficient level" Joint Collaborative Team on Video Coding (JCT-VC) of ITU-T S6 WB3 and ISO/IEC JTC1/SC29/W1; 6th Meeting: Torino, IT; Jul. 14-22, 2011; 4 pages.

Wiegand, T. "Joint Committee Draft" Draft ISO/IEC 14496-10: 2002 ( E ); Joint Video Team (JVTC167) of ISO/IEC MGPG and ITU-T-VCEG; 3rd Meeting; Fairfax, Virginia, USA; May 6-10, 2002; 142 pages.

Tung Nguyen et al.: "Reduced-complexity entropy coding of transform coefficient levels using truncated golomb-rice codes in video compression", Image Processing (ICIP), 2011 18th IEEE Internation Conference on, IEEE, Sep. 11, 2011, all pages.

Lou J et al.: "On coeff_abs_level_minus3 coding", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/,,No. JCTVC-G700, Nov. 9, 2011, all pages.

Jin Heo et al.: "3DV.h: Modified truncated Golomb-Rice Code for 3DV-HTM", 100. MPEG Meeting; Apr. 30, 2012-Apr. 5, 2012; Geneva; (Motion Picture Expert Group or ISO/IEC JTC1/SC29/WG11),, No. m25005, Apr. 28, 2012, all pages.

Aaron Kiely: "Selecting the Golomb Parameter in Rice Coding", IPN Progress Report,, vol. 42-159, Nov. 15, 2004, all pages.

Patent Cooperation Treaty, International Search Report and Written Opinion of the International Searching Authority for International Application No. PCT/US2013/024786, May 21, 2013, 11 pages.

* cited by examiner

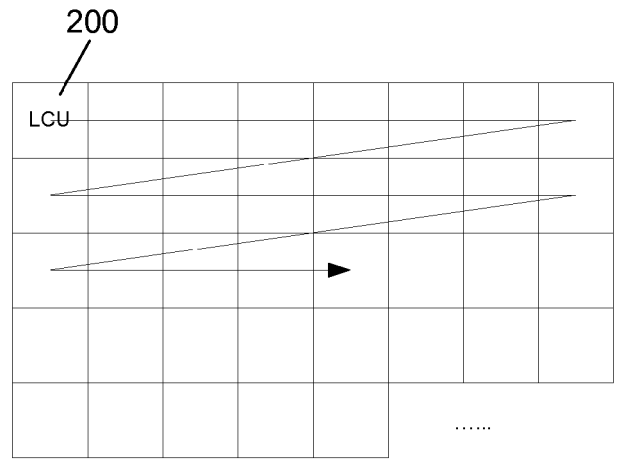
FIG. 2
Prior Art
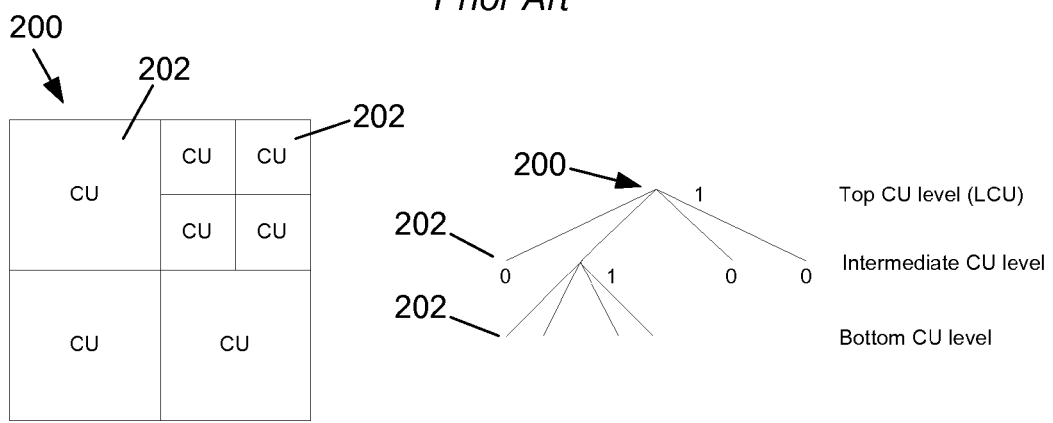
FIG. 3
Prior Art
FIG. 4
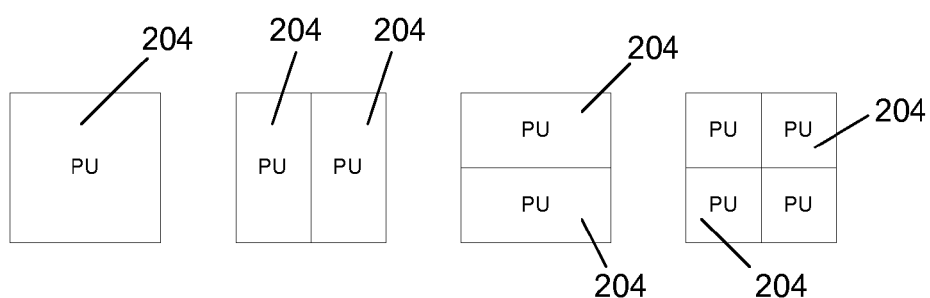
FIG. 5

Table 1

| cRiceParam | cTRMax |
|---|---|
| 0 | 7 |
| 1 | 20 |
| 2 | 42 |
| 3 | 70 |

| cRiceParam | 0 | | 1 | | 2 | | 3 | |
|---|---|---|---|---|---|---|---|---|
| Symbol | Codeword | Bits | Codeword | Bits | Codeword | Bits | Codeword | Bits |
| 0 | 0 | 1 | 00 | 2 | 000 | 3 | 0000 | 4 |
| 1 | 10 | 2 | 01 | 2 | 001 | 3 | 0001 | 4 |
| 2 | 110 | 3 | 100 | 3 | 010 | 3 | 0010 | 4 |
| 3 | 1110 | 4 | 101 | 3 | 011 | 3 | 0011 | 4 |
| 4 | 11110 | 5 | 1100 | 4 | 1000 | 4 | 0100 | 4 |
| 5 | 111110 | 6 | 1101 | 4 | 1001 | 4 | 0101 | 4 |
| 6 | 1111110 | 7 | 11100 | 5 | 1010 | 4 | 0110 | 4 |
| 7 | 11111110 | 8 | 11101 | 5 | 1011 | 4 | 0111 | 4 |
| 8 | 11111111,EG0 | 9 | 111100 | 6 | 11000 | 5 | 10000 | 5 |
| 9 | | | 111101 | 6 | 11001 | 5 | 10001 | 5 |
| 10 | | | 1111100 | 7 | 11010 | 5 | 10010 | 5 |
| 11 | | | 1111101 | 7 | 11011 | 5 | 10011 | 5 |
| 12 | | | 11111100 | 8 | 111000 | 6 | 10100 | 5 |
| 13 | | | 11111101 | 8 | 111001 | 6 | 10101 | 5 |
| 14 | | | 111111100 | 9 | 111010 | 6 | 10110 | 5 |
| 15 | | | 111111101 | 9 | 111011 | 6 | 10111 | 5 |
| 16 | | | 1111111100 | 10 | 1111000 | 7 | 110000 | 6 |
| 17 | | | 1111111101 | 10 | 1111001 | 7 | 110001 | 6 |
| 18 | | | 11111111100 | 11 | 1111010 | 7 | 110010 | 6 |
| 19 | | | 11111111101 | 11 | 1111011 | 7 | 110011 | 6 |
| 20 | | | 11111111110 | 11 | 11111000 | 8 | 110100 | 6 |
| 21 | | | 11111111111,EG0 | 12 | 11111001 | 8 | 110101 | 6 |
| 22 | | | | | 11111010 | 8 | 110110 | 6 |
| 23 | | | | | 11111011 | 8 | 110111 | 6 |
| 24 | | | | | 111110000 | 9 | 1110000 | 7 |
| 25 | | | | | 111111001 | 9 | 1110001 | 7 |
| 26 | | | | | 111111010 | 9 | 1110010 | 7 |
| 27 | | | | | 111111011 | 9 | 1110011 | 7 |
| 28 | | | | | 1111111000 | 10 | 1110100 | 7 |
| 29 | | | | | 1111111001 | 10 | 1110101 | 7 |
| 30 | | | | | 1111111010 | 10 | 1110110 | 7 |
| 31 | | | | | 1111111011 | 10 | 1110111 | 7 |
| 32 | | | | | 11111111000 | 11 | 11110000 | 8 |
| 33 | | | | | 11111111001 | 11 | 11110001 | 8 |
| 34 | | | | | 11111111010 | 11 | 11110010 | 8 |
| 35 | | | | | 11111111011 | 11 | 11110011 | 8 |
| 36 | | | | | 111111111000 | 12 | 11110100 | 8 |
| 37 | | | | | 111111111001 | 12 | 11110101 | 8 |
| 38 | | | | | 111111111010 | 12 | 11110110 | 8 |
| 39 | | | | | 111111111011 | 12 | 11110111 | 8 |
| 40 | | | | | 111111111100 | 12 | 111110000 | 9 |
| 41 | | | | | 111111111101 | 12 | 111110001 | 9 |
| 42 | | | | | 111111111110 | 12 | 111110010 | 9 |
| 43 | | | | | 111111111111,EG0 | 13 | 111110011 | 9 |
| 44 | | | | | | | 111110100 | 9 |
| 45 | | | | | | | 111110101 | 9 |
| 46 | | | | | | | 111110110 | 9 |
| 47 | | | | | | | 111110111 | 9 |
| 48 | | | | | | | 1111110000 | 10 |
| 49 | | | | | | | 1111110001 | 10 |
| 50 | | | | | | | 1111110010 | 10 |
| 51 | | | | | | | 1111110011 | 10 |
| 52 | | | | | | | 1111110100 | 10 |
| 53 | | | | | | | 1111110101 | 10 |
| 54 | | | | | | | 1111110110 | 10 |
| 55 | | | | | | | 1111110111 | 10 |
| 56 | | | | | | | 11111110000 | 11 |
| 57 | | | | | | | 11111110001 | 11 |
| 58 | | | | | | | 11111110010 | 11 |
| 59 | | | | | | | 11111110011 | 11 |
| 60 | | | | | | | 11111110100 | 11 |
| 61 | | | | | | | 11111110101 | 11 |
| 62 | | | | | | | 11111110110 | 11 |
| 63 | | | | | | | 11111110111 | 11 |
| 64 | | | | | | | 11111111000 | 11 |
| 65 | | | | | | | 11111111001 | 11 |
| 66 | | | | | | | 11111111010 | 11 |
| 67 | | | | | | | 11111111011 | 11 |
| 68 | | | | | | | 11111111100 | 11 |
| 69 | | | | | | | 11111111101 | 11 |
| 70 | | | | | | | 11111111110 | 11 |
| 71 | | | | | | | 11111111111,EG0 | 12 |

Table 2

FIG. 13

Table 3

| | coeff_abs_level_minus3[n-1] | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| Previous cRiceParam | 0 | 0 | 0 | 1 | 1 | 1 | 2 | 2 | 2 | 2 | 2 | 2 | 3 | 3 | 3 | 3 | 3 |
| | 1 | 1 | 1 | 1 | 1 | 1 | 2 | 2 | 2 | 2 | 2 | 2 | 3 | 3 | 3 | 3 | 3 |
| | 2 | 2 | 2 | 2 | 2 | 2 | 2 | 2 | 2 | 2 | 2 | 2 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

FIG. 15

Table 4

| cRiceParam | cTRMax |
|---|---|
| 0 | 7 |
| 1 | 14 |
| 2 | 26 |
| 3 | 46 |
| 4 | 78 |

FIG. 16

| cRiceParam | 0 | | 1 | | 2 | | 3 | | 4 | |
|---|---|---|---|---|---|---|---|---|---|---|
| Symbol | Codeword | Bits | Codeword | Bits | Codeword | Bits | Codeword | Bits | Codeword | Bits |
| 0 | 0 | 1 | 00 | 2 | 000 | 3 | 0000 | 4 | 00000 | 5 |
| 1 | 10 | 2 | 01 | 2 | 001 | 3 | 0001 | 4 | 00001 | 5 |
| 2 | 110 | 3 | 100 | 3 | 010 | 3 | 0010 | 4 | 00010 | 5 |
| 3 | 1110 | 4 | 101 | 3 | 011 | 3 | 0011 | 4 | 00011 | 5 |
| 4 | 11110 | 5 | 1100 | 4 | 1000 | 4 | 0100 | 4 | 00100 | 5 |
| 5 | 111110 | 6 | 1101 | 4 | 1001 | 4 | 0101 | 4 | 00101 | 5 |
| 6 | 1111110 | 7 | 11100 | 5 | 1010 | 4 | 0110 | 4 | 00110 | 5 |
| 7 | 11111110 | 8 | 11101 | 5 | 1011 | 4 | 0111 | 4 | 00111 | 5 |
| 8 | 11111111,EG0 | 9 | 111100 | 6 | 11000 | 5 | 10000 | 5 | 01000 | 5 |
| 9 | | | 111101 | 6 | 11001 | 5 | 10001 | 5 | 01001 | 5 |
| 10 | | | 1111100 | 7 | 11010 | 5 | 10010 | 5 | 01010 | 5 |
| 11 | | | 1111101 | 7 | 11011 | 5 | 10011 | 5 | 01011 | 5 |
| 12 | | | 11111100 | 8 | 111000 | 6 | 10100 | 5 | 01100 | 5 |
| 13 | | | 11111101 | 8 | 111001 | 6 | 10101 | 5 | 01101 | 5 |
| 14 | | | 11111110 | 8 | 111010 | 6 | 10110 | 5 | 01110 | 5 |
| 15 | | | 11111111,EG0 | 9 | 111011 | 6 | 10111 | 5 | 01111 | 5 |
| 16 | | | | | 1111000 | 7 | 110000 | 6 | 100000 | 6 |
| 17 | | | | | 1111001 | 7 | 110001 | 6 | 100001 | 6 |
| 18 | | | | | 1111010 | 7 | 110010 | 6 | 100010 | 6 |
| 19 | | | | | 1111011 | 7 | 110011 | 6 | 100011 | 6 |
| 20 | | | | | 11111000 | 8 | 110100 | 6 | 100100 | 6 |
| 21 | | | | | 11111001 | 8 | 110101 | 6 | 100101 | 6 |
| 22 | | | | | 11111010 | 8 | 110110 | 6 | 100110 | 6 |
| 23 | | | | | 11111011 | 8 | 110111 | 6 | 100111 | 6 |
| 24 | | | | | 11111100 | 8 | 1110000 | 7 | 101000 | 6 |
| 25 | | | | | 11111101 | 8 | 1110001 | 7 | 101001 | 6 |
| 26 | | | | | 11111110 | 8 | 1110010 | 7 | 101010 | 6 |
| 27 | | | | | 11111111,EG0 | 9 | 1110011 | 7 | 101011 | 6 |
| 28 | | | | | | | 1110100 | 7 | 101100 | 6 |
| 29 | | | | | | | 1110101 | 7 | 101101 | 6 |
| 30 | | | | | | | 1110110 | 7 | 101110 | 6 |
| 31 | | | | | | | 1110111 | 7 | 101111 | 6 |
| 32 | | | | | | | 11110000 | 8 | 1100000 | 7 |
| 33 | | | | | | | 11110001 | 8 | 1100001 | 7 |
| 34 | | | | | | | 11110010 | 8 | 1100010 | 7 |
| 35 | | | | | | | 11110011 | 8 | 1100011 | 7 |
| 36 | | | | | | | 11110100 | 8 | 1100100 | 7 |
| 37 | | | | | | | 11110101 | 8 | 1100101 | 7 |
| 38 | | | | | | | 11110110 | 8 | 1100110 | 7 |
| 39 | | | | | | | 11110111 | 8 | 1100111 | 7 |
| 40 | | | | | | | 11111000 | 8 | 1101000 | 7 |
| 41 | | | | | | | 11111001 | 8 | 1101001 | 7 |
| 42 | | | | | | | 11111010 | 8 | 1101010 | 7 |
| 43 | | | | | | | 11111011 | 8 | 1101011 | 7 |
| 44 | | | | | | | 11111100 | 8 | 1101100 | 7 |
| 45 | | | | | | | 11111101 | 8 | 1101101 | 7 |
| 46 | | | | | | | 11111110 | 8 | 1101110 | 7 |
| 47 | | | | | | | 11111111,EG0 | 9 | 1101111 | 7 |
| 48 | | | | | | | | | 11100000 | 8 |
| 49 | | | | | | | | | 11100001 | 8 |
| 50 | | | | | | | | | 11100010 | 8 |
| 51 | | | | | | | | | 11100011 | 8 |
| 52 | | | | | | | | | 11100100 | 8 |
| 53 | | | | | | | | | 11100101 | 8 |
| 54 | | | | | | | | | 11100110 | 8 |
| 55 | | | | | | | | | 11100111 | 8 |
| 56 | | | | | | | | | 11101000 | 8 |
| 57 | | | | | | | | | 11101001 | 8 |
| 58 | | | | | | | | | 11101010 | 8 |
| 59 | | | | | | | | | 11101011 | 8 |
| 60 | | | | | | | | | 11101100 | 8 |
| 61 | | | | | | | | | 11101101 | 8 |
| 62 | | | | | | | | | 11101110 | 8 |
| 63 | | | | | | | | | 11101111 | 8 |
| 64 | | | | | | | | | 11110000 | 8 |
| 65 | | | | | | | | | 11110001 | 8 |
| 66 | | | | | | | | | 11110010 | 8 |
| 67 | | | | | | | | | 11110011 | 8 |
| 68 | | | | | | | | | 11110100 | 8 |
| 69 | | | | | | | | | 11110101 | 8 |
| 70 | | | | | | | | | 11110110 | 8 |
| 71 | | | | | | | | | 11110111 | 8 |
| 72 | | | | | | | | | 11111000 | 8 |
| 73 | | | | | | | | | 11111001 | 8 |
| 74 | | | | | | | | | 11111010 | 8 |
| 75 | | | | | | | | | 11111011 | 8 |
| 76 | | | | | | | | | 11111100 | 8 |
| 77 | | | | | | | | | 11111101 | 8 |
| 78 | | | | | | | | | 11111110 | 8 |
| 79 | | | | | | | | | 11111111,EG0 | 9 |

Table 5

FIG. 17

| cRiceParam | 0 | | 1 | | 2 | | 3 | | 4 | |
|---|---|---|---|---|---|---|---|---|---|---|
| Symbol | Codeword | Bits | Codeword | Bits | Codeword | Bits | Codeword | Bits | Codeword | Bits |
| 0 | 0 | 1 | 00 | 2 | 000 | 3 | 0000 | 4 | 00000 | 5 |
| 1 | 10 | 2 | 01 | 2 | 001 | 3 | 0001 | 4 | 00001 | 5 |
| 2 | 110 | 3 | 100 | 3 | 010 | 3 | 0010 | 4 | 00010 | 5 |
| 3 | 111,0 | 4 | 101 | 3 | 011 | 3 | 0011 | 4 | 00011 | 5 |
| 4 | 111,100 | 6 | 1100 | 4 | 1000 | 4 | 0100 | 4 | 00100 | 5 |
| 5 | 111,101 | 6 | 1101 | 4 | 1001 | 4 | 0101 | 4 | 00101 | 5 |
| 6 | | | 111,00 | 5 | 1010 | 4 | 0110 | 4 | 00110 | 5 |
| 7 | | | 111,01 | 5 | 1011 | 4 | 0111 | 4 | 00111 | 5 |
| 8 | | | 111,1000 | 7 | 11000 | 5 | 10000 | 5 | 01000 | 5 |
| 9 | | | 111,1001 | 7 | 11001 | 5 | 10001 | 5 | 01001 | 5 |
| 10 | | | 111,1010 | 7 | 11010 | 5 | 10010 | 5 | 01010 | 5 |
| 11 | | | 111,1011 | 7 | 11011 | 5 | 10011 | 5 | 01011 | 5 |
| 12 | | | 111,110000 | 9 | 111,000 | 6 | 10100 | 5 | 01100 | 5 |
| 13 | | | 111,110001 | 9 | 111,001 | 6 | 10101 | 5 | 01101 | 5 |
| 14 | | | 111,110010 | 9 | 111,010 | 6 | 10110 | 5 | 01110 | 5 |
| 15 | | | 111,110011 | 9 | 111,011 | 6 | 10111 | 5 | 01111 | 5 |
| 16 | | | 111,110100 | 9 | 111,10000 | 8 | 110000 | 6 | 100000 | 6 |
| 17 | | | 111,110101 | 9 | 111,10001 | 8 | 110001 | 6 | 100001 | 6 |
| 18 | | | 111,110110 | 9 | 111,10010 | 8 | 110010 | 6 | 100010 | 6 |
| 19 | | | 111,110111 | 9 | 111,10011 | 8 | 110011 | 6 | 100011 | 6 |
| 20 | | | | | 111,10100 | 8 | 110100 | 6 | 100100 | 6 |
| 21 | | | | | 111,10101 | 8 | 110101 | 6 | 100101 | 6 |
| 22 | | | | | 111,10110 | 8 | 110110 | 6 | 100110 | 6 |
| 23 | | | | | 111,10111 | 8 | 110111 | 6 | 100111 | 6 |
| 24 | | | | | 111,1100000 | 10 | 111,0000 | 7 | 101000 | 6 |
| 25 | | | | | | | 111,0001 | 7 | 101001 | 6 |
| 26 | | | | | | | 111,0010 | 7 | 101010 | 6 |
| 27 | | | | | | | 111,0011 | 7 | 101011 | 6 |
| 28 | | | | | | | 111,0100 | 7 | 101100 | 6 |
| 29 | | | | | | | 111,0101 | 7 | 101101 | 6 |
| 30 | | | | | | | 111,0110 | 7 | 101110 | 6 |
| 31 | | | | | | | 111,0111 | 7 | 101111 | 6 |
| 32 | | | | | | | 111,100000 | 9 | 1100000 | 7 |
| 33 | | | | | | | 111,100001 | 9 | 1100001 | 7 |
| 34 | | | | | | | 111,100010 | 9 | 1100010 | 7 |
| 35 | | | | | | | 111,100011 | 9 | 1100011 | 7 |
| 36 | | | | | | | 111,100100 | 9 | 1100100 | 7 |
| 37 | | | | | | | 111,100101 | 9 | 1100101 | 7 |
| 38 | | | | | | | 111,100110 | 9 | 1100110 | 7 |
| 39 | | | | | | | 111,100111 | 9 | 1100111 | 7 |
| 40 | | | | | | | 111,101000 | 9 | 1101000 | 7 |
| 41 | | | | | | | 111,101001 | 9 | 1101001 | 7 |
| 42 | | | | | | | 111,101010 | 9 | 1101010 | 7 |
| 43 | | | | | | | 111,101011 | 9 | 1101011 | 7 |
| 44 | | | | | | | 111,101100 | 9 | 1101100 | 7 |
| 45 | | | | | | | 111,101101 | 9 | 1101101 | 7 |
| 46 | | | | | | | 111,101110 | 9 | 1101110 | 7 |
| 47 | | | | | | | 111,101111 | 9 | 1101111 | 7 |
| 48 | | | | | | | | | 111,00000 | 8 |
| 49 | | | | | | | | | 111,00001 | 8 |
| 50 | | | | | | | | | 111,00010 | 8 |
| 51 | | | | | | | | | 111,00011 | 8 |
| 52 | | | | | | | | | 111,00100 | 8 |
| 53 | | | | | | | | | 111,00101 | 8 |
| 54 | | | | | | | | | 111,00110 | 8 |
| 55 | | | | | | | | | 111,00111 | 8 |
| 56 | | | | | | | | | 111,01000 | 8 |
| 57 | | | | | | | | | 111,01001 | 8 |
| 58 | | | | | | | | | 111,01010 | 8 |
| 59 | | | | | | | | | 111,01011 | 8 |
| 60 | | | | | | | | | 111,01100 | 8 |
| 61 | | | | | | | | | 111,01101 | 8 |
| 62 | | | | | | | | | 111,01110 | 8 |
| 63 | | | | | | | | | 111,01111 | 8 |
| 64 | | | | | | | | | 111,1000000 | 10 |
| 65 | | | | | | | | | 111,1000001 | 10 |
| 66 | | | | | | | | | 111,1000010 | 10 |
| 67 | | | | | | | | | 111,1000011 | 10 |
| 68 | | | | | | | | | 111,1000100 | 10 |
| 69 | | | | | | | | | 111,1000101 | 10 |
| 70 | | | | | | | | | 111,1000110 | 10 |
| 71 | | | | | | | | | 111,1000111 | 10 |

Table 7

FIG. 19

Table 8

| | | coeff_abs_level_minus3[n-1] | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Previous cRiceParam | 0 | 0 | 0 | 1 | 1 | 1 | 2 | 2 | 2 | 2 | 2 | 2 | 3 | 3 | 3 | 3 | 3 |
| | 1 | 1 | 1 | 1 | 1 | 1 | 2 | 2 | 2 | 2 | 2 | 2 | 3 | 3 | 3 | 3 | 3 |
| | 2 | 2 | 2 | 2 | 2 | 2 | 2 | 2 | 2 | 2 | 2 | 2 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 | 4 | 4 | 4 |

| | | coeff_abs_level_minus3[n-1] | | | | | | | |
|---|---|---|---|---|---|---|---|---|---|
| | | 16 | 17 | 18 | 19 | 20 | 21 | 22 | ≥23 |
| Previous cRiceParam | 0 | 3 | 3 | 3 | 3 | 3 | 3 | 3 | 4 |
| | 1 | 3 | 3 | 3 | 3 | 3 | 3 | 3 | 4 |
| | 2 | 3 | 3 | 3 | 3 | 3 | 3 | 3 | 4 |
| | 3 | 3 | 3 | 3 | 3 | 3 | 3 | 3 | 4 |
| | 4 | 4 | 4 | 4 | 4 | 4 | 4 | 4 | 4 |

FIG. 20

```
cRiceParam = cRiceParam
            + (coeff_abs_level_minus3[n-1] >= 2   &&  cRiceParam == 0)
            + (coeff_abs_level_minus3[n-1] >= 5   &&  cRiceParam <= 1)
            + (coeff_abs_level_minus3[n-1] >= 11  &&  cRiceParam <= 2);
            + (coeff_abs_level_minus3[n-1] >= 23  &&  cRiceParam <= 3);
```

FIG. 21

Table 9

| cLastRiceParam | cLastSE | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | >11 |
| 0 | 0 | 0 | 0 | 1 | 1 | 1 | 2 | 2 | 2 | 2 | 2 | 2 | 3 |
| 1 | 1 | 1 | 1 | 1 | 1 | 1 | 2 | 2 | 2 | 2 | 2 | 2 | 3 |
| 2 | 2 | 2 | 2 | 2 | 2 | 2 | 2 | 2 | 2 | 2 | 2 | 2 | 3 |
| 3 | 3 | 3 | 3 | 3 | 3 | 3 | 3 | 3 | 3 | 3 | 3 | 3 | 3 |

FIG. 24

Table 10

| | | cLastSE | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| cLastRiceParam | 0 | 0 | 0 | 0 | 1 | 1 | 1 | 2 | 2 | 2 | 2 | 2 | 2 | 3 | 3 | 3 | 3 |
| | 1 | 1 | 1 | 1 | 1 | 1 | 1 | 2 | 2 | 2 | 2 | 2 | 2 | 3 | 3 | 3 | 3 |
| | 2 | 2 | 2 | 2 | 2 | 2 | 2 | 2 | 2 | 2 | 2 | 2 | 2 | 3 | 3 | 3 | 3 |
| | 3 | 3 | 3 | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 | 4 | 4 | 4 |
| | | cLastSE | | | | | | | | | | | | | | | |
| | | 16 | 17 | 18 | 19 | 20 | 21 | 22 | 23 | ≥24 | | | | | | | |
| cLastRiceParam | 0 | 3 | 3 | 3 | 3 | 3 | 3 | 3 | 3 | 4 | | | | | | | |
| | 1 | 3 | 3 | 3 | 3 | 3 | 3 | 3 | 3 | 4 | | | | | | | |
| | 2 | 3 | 3 | 3 | 3 | 3 | 3 | 3 | 3 | 4 | | | | | | | |
| | 3 | 3 | 3 | 3 | 3 | 3 | 3 | 3 | 3 | 4 | | | | | | | |
| | 4 | 4 | 4 | 4 | 4 | 4 | 4 | 4 | 4 | 4 | | | | | | | |

FIG. 25

```
cRiceParam = cLastRiceParam
            + (cLastSE >= 3  && cLastRiceParam == 0);
            + (cLastSE >= 6  && cLastRiceParam <= 1);
            + (cLastSE >= 12 && cLastRiceParam <= 2);
            + (cLastSE >= 24 && cLastRiceParam <= 3);
```

FIG. 26

Table 11

| | | \multicolumn{16}{c}{cLastSE} |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| cLastRiceParam | 0 | 0 | 0 | 0 | 1 | 1 | 1 | 2 | 2 | 2 | 2 | 2 | 2 | 3 | 3 | 3 | 3 |
| | 1 | 1 | 1 | 1 | 1 | 1 | 1 | 2 | 2 | 2 | 2 | 2 | 2 | 3 | 3 | 3 | 3 |
| | 2 | 2 | 2 | 2 | 2 | 2 | 2 | 2 | 2 | 2 | 2 | 2 | 2 | 3 | 3 | 3 | 3 |
| | 3 | 3 | 3 | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 | 4 | 4 | 4 |

| | | cLastSE | | | | | | | |
|---|---|---|---|---|---|---|---|---|---|
| | | 16 | 17 | 18 | 19 | 20 | 21 | 22 | ≥23 |
| cLastRiceParam | 0 | 3 | 3 | 3 | 3 | 3 | 3 | 3 | 4 |
| | 1 | 3 | 3 | 3 | 3 | 3 | 3 | 3 | 4 |
| | 2 | 3 | 3 | 3 | 3 | 3 | 3 | 3 | 4 |
| | 3 | 3 | 3 | 3 | 3 | 3 | 3 | 3 | 4 |
| | 4 | 4 | 4 | 4 | 4 | 4 | 4 | 4 | 4 |

FIG. 27

```
cRiceParam = cLastRiceParam
            + (cLastSE >= 3  && cLastRiceParam == 0);
            + (cLastSE >= 6  && cLastRiceParam <= 1);
            + (cLastSE >= 12 && cLastRiceParam <= 2);
            + (cLastSE >= 23 && cLastRiceParam <= 3);
```

FIG. 28

Table 12

| | | \| | \| | \| | \| | \| | \| | cLastSE | \| | \| | \| | \| | \| | \| | \| | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| cLastRiceParam | 0 | 0 | 0 | 0 | 1 | 1 | 1 | 1 | 1 | 1 | 1 | 1 | 1 | 1 | 1 | 1 | 1 |
| | 1 | 1 | 1 | 1 | 1 | 1 | 1 | 2 | 2 | 2 | 2 | 2 | 2 | 2 | 2 | 2 | 2 |
| | 2 | 2 | 2 | 2 | 2 | 2 | 2 | 2 | 2 | 2 | 2 | 2 | 2 | 3 | 3 | 3 | 3 |
| | 3 | 3 | 3 | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 | 4 | 4 | 4 |

| | | cLastSE | | | | | | | | |
|---|---|---|---|---|---|---|---|---|---|
| | | 16 | 17 | 18 | 19 | 20 | 21 | 22 | 23 | ≥24 |
| cLastRiceParam | 0 | 1 | 1 | 1 | 1 | 1 | 1 | 1 | 1 | 1 |
| | 1 | 2 | 2 | 2 | 2 | 2 | 2 | 2 | 2 | 2 |
| | 2 | 3 | 3 | 3 | 3 | 3 | 3 | 3 | 3 | 3 |
| | 3 | 3 | 3 | 3 | 3 | 3 | 3 | 3 | 3 | 4 |
| | 4 | 4 | 4 | 4 | 4 | 4 | 4 | 4 | 4 | 4 |

FIG. 29

$$\begin{aligned}
\text{cRiceParam} = \text{cLastRiceParam} \\
+ \, [(\text{cLastSE} >= 3 \,\, \&\& \,\, \text{cLastRiceParam} == 0) \, || \\
(\text{cLastSE} >= 6 \,\, \&\& \,\, \text{cLastRiceParam} == 1) \, || \\
(\text{cLastSE} >= 12 \,\, \&\& \,\, \text{cLastRiceParam} == 2) \, || \\
(\text{cLastSE} >= 24 \,\, \&\& \,\, \text{cLastRiceParam} == 3) \,]
\end{aligned}$$

FIG. 30

Table 13

| | | cLastSE | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| cLastRiceParam | 0 | 0 | 0 | 0 | 0 | 1 | 1 | 1 | 1 | 1 | 1 | 1 | 1 | 1 | 1 | 1 | 1 |
| | 1 | 1 | 1 | 1 | 1 | 1 | 1 | 1 | 2 | 2 | 2 | 2 | 2 | 2 | 2 | 2 | 2 |
| | 2 | 2 | 2 | 2 | 2 | 2 | 2 | 2 | 2 | 2 | 2 | 2 | 2 | 2 | 3 | 3 | 3 |
| | 3 | 3 | 3 | 3 | 3 | 3 | 3 | 3 | 3 | 3 | 3 | 3 | 3 | 3 | 3 | 3 | 3 |
| | 4 | 4 | 4 | 4 | 4 | 4 | 4 | 4 | 4 | 4 | 4 | 4 | 4 | 4 | 4 | 4 | 4 |

| | | cLastSE | | | | | | | | | |
|---|---|---|---|---|---|---|---|---|---|---|---|
| | | 16 | 17 | 18 | 19 | 20 | 21 | 22 | 23 | 24 | ≥25 |
| cLastRiceParam | 0 | 1 | 1 | 1 | 1 | 1 | 1 | 1 | 1 | 1 | 1 |
| | 1 | 2 | 2 | 2 | 2 | 2 | 2 | 2 | 2 | 2 | 2 |
| | 2 | 3 | 3 | 3 | 3 | 3 | 3 | 3 | 3 | 3 | 3 |
| | 3 | 3 | 3 | 3 | 3 | 3 | 3 | 3 | 3 | 3 | 4 |
| | 4 | 4 | 4 | 4 | 4 | 4 | 4 | 4 | 4 | 4 | 4 |

FIG. 31

$$cRiceParam = cLastRiceParam$$
$$+ [(cLastSE > 3 \ \&\& \ cLastRiceParam == 0) \ ||$$
$$(cLastSE > 6 \ \&\& \ cLastRiceParam == 1) \ ||$$
$$(cLastSE > 12 \ \&\& \ cLastRiceParam == 2) \ ||$$
$$(cLastSE > 24 \ \&\& \ cLastRiceParam == 3) \ ]$$

FIG. 32

METHOD OF DETERMINING BINARY CODEWORDS FOR TRANSFORM COEFFICIENTS

CROSS REFERENCE TO RELATED APPLICATIONS

This Application claims priority under 35 U.S.C. §119(e) from earlier filed U.S. Provisional Application Ser. No. 61/595,134, filed Feb. 5, 2012, and earlier filed U.S. Provisional Application Ser. No. 61/595,153, filed Feb. 6, 2012, the entirety of which are incorporated herein by reference.

BACKGROUND

1. Technical Field

The present disclosure relates to the field of video compression, particularly video compression using High Efficiency Video Coding (HEVC) that employ block processing.

2. Related Art

FIG. 1 depicts a content distribution system 100 comprising a coding system 110 and a decoding system 140 that can be used to transmit and receive HEVC data. In some embodiments, the coding system 110 can comprise an input interface 130, a controller 111, a counter 112, a frame memory 113, an encoding unit 114, a transmitter buffer 115 and an output interface 135. The decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random access memory and a read only memory.

Source pictures 120 supplied from, by way of a non-limiting example, a content provider can include a video sequence of frames including source pictures in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding units can be derived from the source pictures utilizing the controller 111. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the Coding Units based on a source picture. In response to the encoding control signal 124 from the controller 111, the encoding unit 114 can begin to read out the prepared Coding Units to a high-efficiency encoding process, such as a prediction coding process or a transform coding process which process the prepared Coding Units generating video compression data based on the source pictures associated with the Coding Units.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitted buffer 115 so the counter 112 can be incremented or decremented. The controller 111 can control the production of video packets produced by the encoding unit 114 on the basis of the occupied area information 126 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

In various embodiments, the coding system 110 can be incorporated or otherwise associated with a transcoder or an encoding apparatus at a headend and the decoding system 140 can be incorporated or otherwise associated with a downstream device, such as a mobile device, a set top box or a transcoder.

The coding system 110 and decoding system 140 can be utilized separately or together to encode and decode video data according to various coding formats, including High Efficiency Video Coding (HEVC). HEVC is a block based hybrid spatial and temporal predictive coding scheme. In HEVC, input images, such as video frames, can be divided into square blocks called Largest Coding Units (LCUs) 200, as shown in FIG. 2. LCUs 200 can each be as large as 128× 128 pixels, unlike other coding schemes that break input images into macroblocks of 16×16 pixels. As shown in FIG. 3, each LCU 200 can be partitioned by splitting the LCU 200 into four Coding Units (CUs) 202. CUs 202 can be square blocks each a quarter size of the LCU 200. Each CU 202 can be further split into four smaller CUs 202 each a quarter size of the larger CU 202. By way of a non-limiting example, the CU 202 in the upper right corner of the LCU 200 depicted in FIG. 3 can be divided into four smaller CUs 202. In some embodiments, these smaller CUs 202 can be further split into even smaller sized quarters, and this process of splitting CUs 202 into smaller CUs 202 can be completed multiple times.

With higher and higher video data density, what is needed are further improved ways to code the CUs so that large input images and/or macroblocks can be rapidly, efficiently and accurately encoded and decoded.

SUMMARY

The present invention provides an improved system for HEVC. In embodiments for the system, a method of determining binary codewords for transform coefficients in an efficient manner is provided. Codewords for the transform coefficients within transform units (TUs) that are subdivisions of the CUs 202 are used in encoding input images and/or macroblocks. In some embodiments, the codewords can have a Truncated Rice portion having a predefined maximum number of bits.

In one embodiment, a method is provided that comprises providing a transform unit comprising one or more groups of the transform coefficients, each of the transform coefficients having a quantized value, coding a first flag for each of the transform coefficients that have an absolute value greater than one until a first condition is reached, coding a second flag for each of the transform coefficients that have an absolute value greater than two until a second condition is reached, determining a symbol for each of the remaining transform coefficients for which the first flag and the second flag were not coded, each symbol having an associated syntax element, providing a parameter variable, initially setting the parameter variable to a value of zero, converting each symbol into a binary codeword based on the value of the parameter variable, and updating the parameter variable after each symbol has been converted by setting the parameter variable to a new value, the new value being based at least in part on the value of the parameter variable preceding the updating and the syntax element of the most recently converted symbol, wherein each the binary codeword comprises a Truncated Rice portion having up to a predefined maximum number of bits.

In another embodiment, a video processing system is provided that comprises a memory configured to store one or more transform coefficients each having a quantized value, a processor coupled with the memory, the processor being configured to code a first flag for each of the transform coefficients that have an absolute value greater than one until a first condition is reached, code a second flag for each of the transform coefficients that have an absolute value greater than two until a second condition is reached, obtain a symbol for each of the remaining transform coefficients for which the first flag and the second flag were not coded, each symbol having an associated syntax element, set a parameter variable to an initial value of zero, convert the symbol to the binary codeword based on the value of the parameter variable, and update the value of the parameter variable after the symbol has been converted, wherein the binary codeword comprises a Truncated Rice portion having up to a predefined maximum number of bits.

BRIEF DESCRIPTION OF THE DRAWINGS

Further details of the present invention are explained with the help of the attached drawings in which:

FIG. 2 depicts an embodiment of an input image divided into Large Coding Units.

FIG. 3 depicts an embodiment of a Large Coding Unit divided into Coding Units.

FIG. 4 depicts a quadtree representation of a Large Coding Unit divided into Coding Units.

FIG. 5 depicts possible exemplary arrangements of Prediction Units within a Coding Unit.

FIG. 13 depicts a first exemplary embodiment of a table for converting symbols into binary codewords based on parameter variable values of 0, 1, 2, and 3.

FIG. 15 depicts a first exemplary embodiment of a low complexity updating table with possible parameter variables values of 0, 1, 2, and 3.

FIG. 16 depicts a first exemplary embodiment of maximum symbol values for associated parameter variable values of 0, 1, 2, 3, and 4.

FIG. 17 depicts a first exemplary embodiment of a table for converting symbols into binary codewords based on parameter variable values of 0, 1, 2, 3, and 4.

FIG. 19 depicts a second exemplary embodiment of a table for converting symbols into binary codewords based on parameter variable values of 0, 1, 2, 3, and 4.

FIG. 20 depicts an alternate embodiment of a method of obtaining coefficient levels and symbols for transform coefficients.

FIG. 21 depicts an alternate flowchart for a method for coding symbols and updating parameter variables.

FIG. 24 depicts a second exemplary embodiment of a low complexity updating table with possible parameter variables values of 0, 1, 2, and 3.

FIG. 25 depicts a second exemplary embodiment of a low complexity updating table with possible parameter variables values of 0, 1, 2, 3, and 4.

FIG. 26 depicts a second exemplary embodiment of a combination logic representation of conditions for updating a parameter variable with possible parameter variables values of 0, 1, 2, 3, and 4.

FIG. 27 depicts a third exemplary embodiment of a low complexity updating table with possible parameter variables values of 0, 1, 2, 3, and 4.

FIG. 28 depicts a third exemplary embodiment of a combination logic representation of conditions for updating a parameter variable with possible parameter variables values of 0, 1, 2, 3, and 4.

FIG. 29 depicts a fourth exemplary embodiment of a low complexity updating table with possible parameter variables values of 0, 1, 2, 3, and 4.

FIG. 30 depicts a fourth exemplary embodiment of a combination logic representation of conditions for updating a parameter variable with possible parameter variables values of 0, 1, 2, 3, and 4.

FIG. 31 depicts a fifth exemplary embodiment of a low complexity updating table with possible parameter variables values of 0, 1, 2, 3, and 4.

FIG. 32 depicts a fifth exemplary embodiment of a combination logic representation of conditions for updating a parameter variable with possible parameter variables values of 0, 1, 2, 3, and 4.

DETAILED DESCRIPTION

Figure 1:
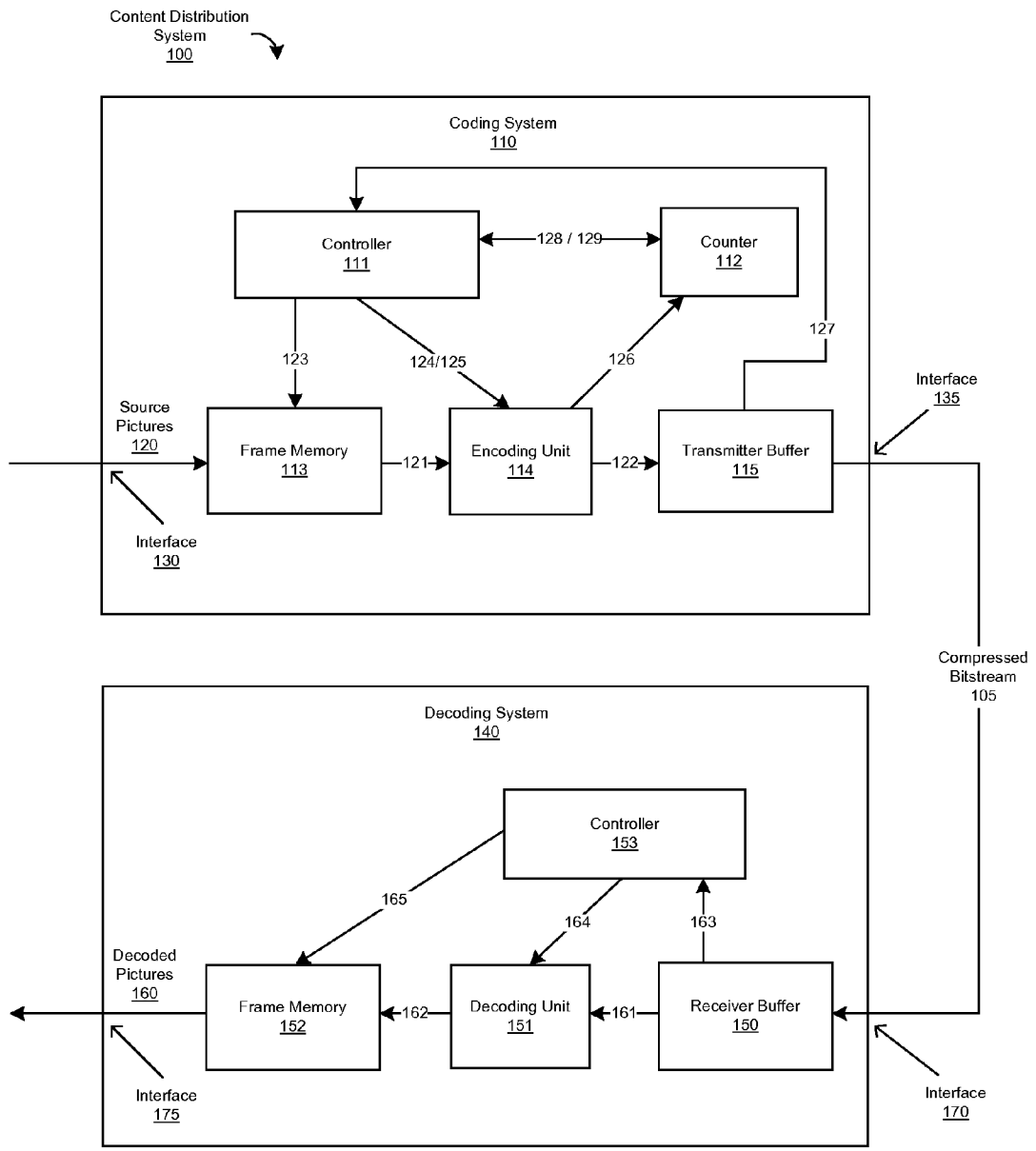
FIG. 1 depicts an embodiment of a content distribution system.

In HEVC, an input image, such as a video frame, is broken up into coding units (CUs) that are then identified in code. The CUs are then further broken into sub-units that are coded as will be described subsequently.

Initially for the coding a quadtree data representation can be used to describe the partition of a large coding unit (LCU) 200. The quadtree representation can have nodes corresponding to the LCU 200 and CUs 202. At each node of the quadtree representation, a flag "1" can be assigned if the LCU 200 or CU 202 is split into four CUs 202. If the node is not split into CUs 202, a flag "0" can be assigned. By way of a non-limiting example, the quadtree representation shown in FIG. 4 can describe the LCU partition shown in FIG. 3, in which the LCU 200 is split into four CUs 202, and the second CU 202 is split into four smaller CUs 202. The binary data representation of the quadtree can be a CU split flag that can be coded and transmitted as overhead, along with other data such as a skip mode flag, merge mode flag, and the PU coding mode described subsequently. By way of a non-limiting example, the CU split flag quadtree representation shown in FIG. 4 can be coded as the binary data representation "10100."

At each leaf of the quadtree, the final CUs 202 can be broken up into one or more blocks called prediction units (PUs) 204. PUs 204 can be square or rectangular. A CU 202 with dimensions of 2N×2N can have one of the four exemplary arrangements of PUs 204 shown in FIG. 5, with PUs 204 having dimensions of 2N×2N, 2N×N, N×2N, or N×N.

A PU can be obtained through spatial or temporal prediction. Temporal prediction is related to inter mode pictures. Spatial prediction relates to intra mode pictures. The PUs 204 of each CU 202 can, thus, be coded in either intra mode or inter mode. Features of coding relating to intra mode and inter mode pictures are described in the paragraphs to follow.

Intra mode coding can use data from the current input image, without referring to other images, to code an I picture. In intra mode the PUs 204 can be spatially predictive coded. Each PU 204 of a CU 202 can have its own spatial prediction direction. Spatial prediction directions can be horizontal, vertical, 45-degree diagonal, 135 degree diagonal, DC, planar, or any other direction. The spatial prediction direction for the PU 204 can be coded as a syntax element. In some embodiments, brightness information (Luma) and color information (Chroma) for the PU 204 can be predicted separately. In some embodiments, the number of Luma intra prediction modes for 4×4, 8×8, 16×16, 32×32, and 64×64 blocks can be 18, 35, 35, 35, and 4 respectively. In alternate embodiments, the number of Luma intra prediction modes for blocks of any size can be 35. An additional mode can be used for the Chroma intra prediction mode. In some embodiments, the Chroma prediction mode can be called "IntraFromLuma."

Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU 204 over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be coded as syntax elements "MV," and the reference pictures can be coded as syntax elements "refIdx." In some embodiments, inter mode coding can allow both spatial and temporal predictive coding.

Figure 6:
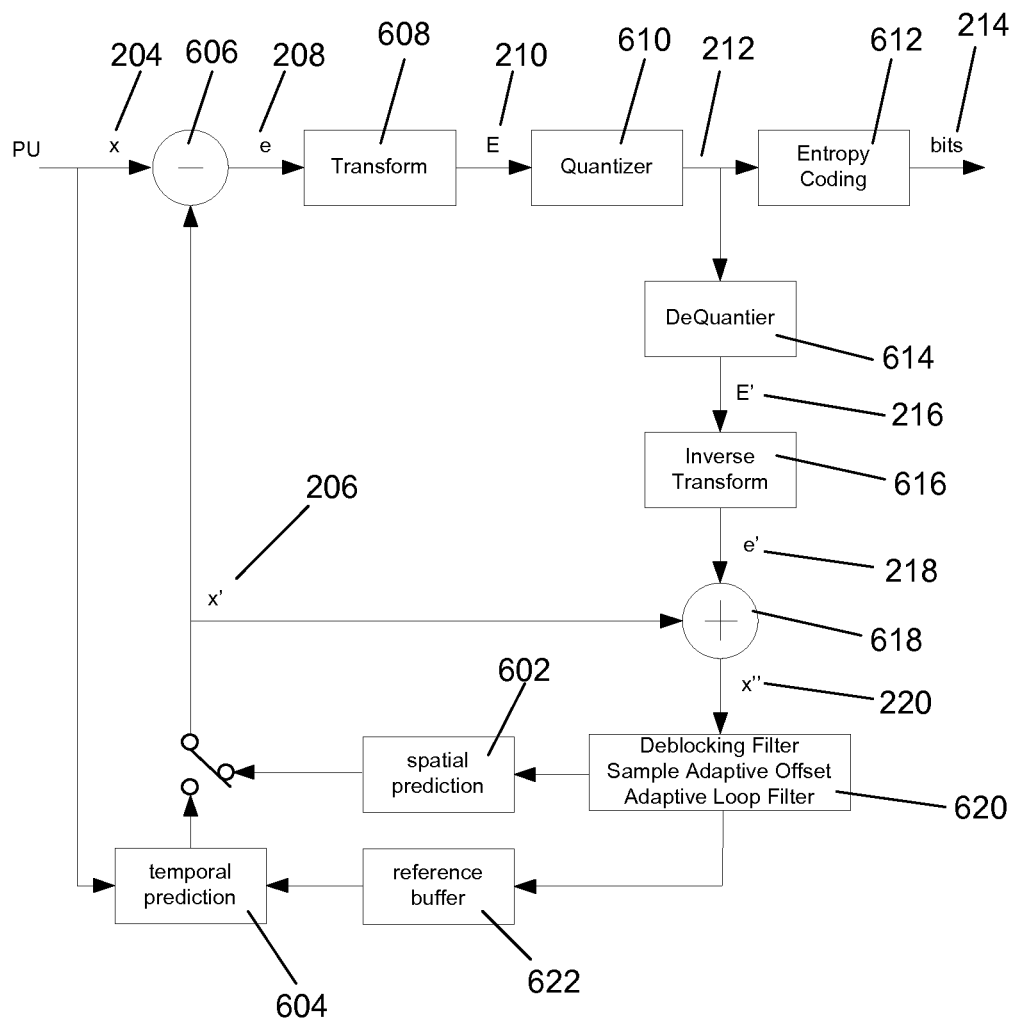
FIG. 6 depicts a block diagram of an embodiment of a method for encoding and/or decoding a Prediction Unit.

FIG. 6 depicts a block diagram of how a PU 204, x, can be encoded and/or decoded. At 606 a predicted PU 206, x', that is predicted by intra mode at 602 or inter mode at 604, as described above, can be subtracted from the current PU 204, x, to obtain a residual PU 208, e. At 608 the residual PU 208, e, can be transformed with a block transform into one or more transform units (TUs) 210, E. Each TU 210 can comprise one or more transform coefficients 212. In some embodiments, the block transform can be square. In alternate embodiments, the block transform can be non-square.

Figure 7:
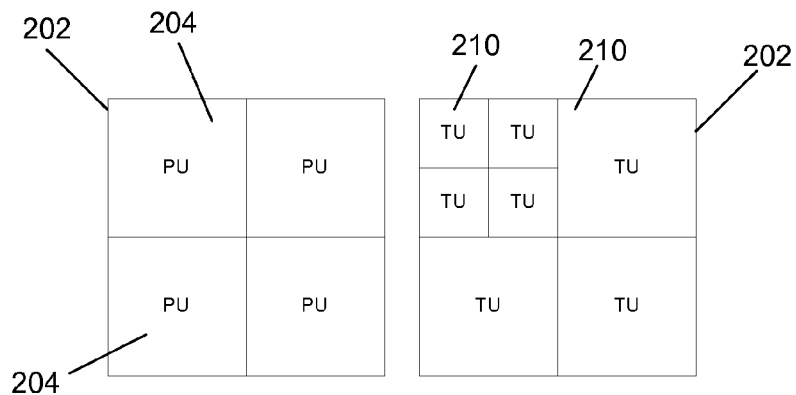
FIG. 7 depicts an exemplary embodiment of a Coding Unit divided into Prediction Units and Transform Units.
Figure 8:
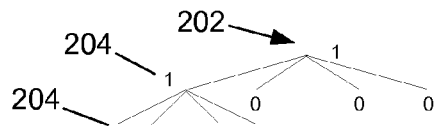
FIG. 8 depicts an exemplary embodiment of a quadtree representation of a Coding Unit divided into Transform Units.

As shown in FIG. 7, in HEVC, a set of block transforms of different sizes can be performed on a CU 202, such that some PUs 204 can be divided into smaller TUs 210 and other PUs 204 can have TUs 210 the same size as the PU 204. Division of CUs 202 and PUs 204 into TUs 210 can be shown by a quadtree representation. By way of a non-limiting example, the quadtree representation shown in FIG. 8 depicts the arrangement of TUs 210 within the CU 202 shown in FIG. 7.

Referring back to FIG. 6, at 610 the transform coefficients 212 of the TU 210, E, can be quantized into one of a finite number of possible values. In some embodiments, this is a lossy operation in which data lost by quantization may not be recoverable. After the transform coefficients 212 have been quantized, at 612 the quantized transform coefficients 212 can be entropy coded, as discussed below, to obtain the final compression bits 214.

At 614 the quantized transform coefficients 212 can be dequantized into dequantized transform coefficients 216 E'. At 616 the dequantized transform coefficients 216 E' can then be inverse transformed to reconstruct the residual PU 218, e'. At 618 the reconstructed residual PU 218, e', can then be added to a corresponding prediction PU 206, x', obtained through either spatial prediction at 602 or temporal prediction at 604, to obtain a reconstructed PU 220, x". At 620 a deblocking filter can be used on reconstructed PUs 220, x", to reduce blocking artifacts. At 620 a sample adaptive offset process is also provided that can be conditionally performed to compensate the pixel value offset between reconstructed pixels and original pixels. Further, at 620, an adaptive loop filter can be conditionally used on the reconstructed PUs 220, x", to reduce or minimize coding distortion between input and output images.

If the reconstructed image is a reference image that will be used for future temporal prediction in inter mode coding, the reconstructed images can be stored in a reference buffer 622. Intra mode coded images can be a possible point where decoding can begin without needing additional reconstructed images.

Figure 9:
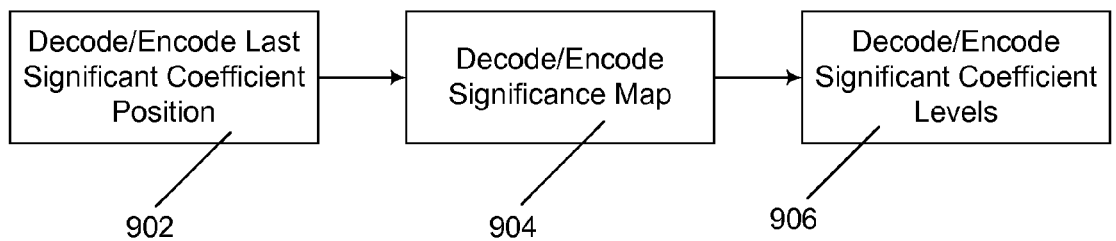
FIG. 9 depicts an embodiment of a method of performing context-based adaptive binary arithmetic coding for transform coefficient encoding/decoding.
Figure 10:
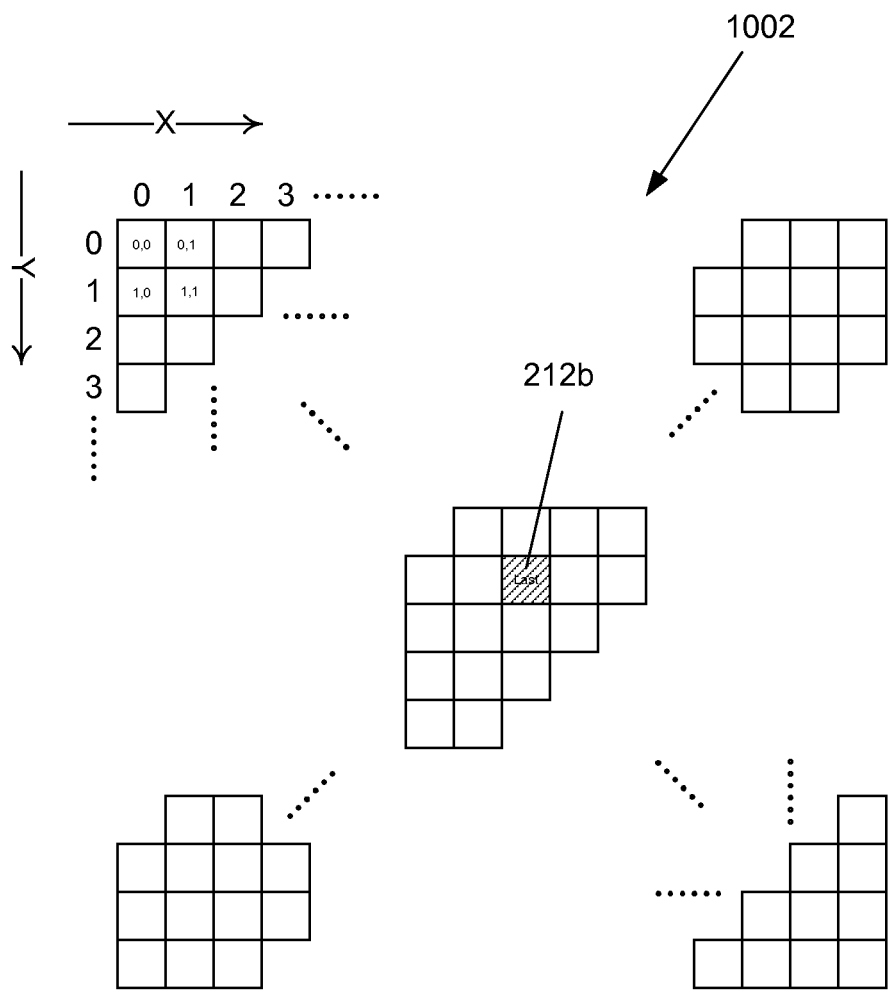
FIG. 10 depicts an exemplary embodiment of a significance map.

HEVC can use entropy coding schemes during step 612 such as context-based adaptive binary arithmetic coding (CABAC). The coding process for CABAC is shown in FIG. 9. At 902, the position of the last significant transform coefficient of the transform units 210 can be coded. Referring back to FIG. 6, the quantized transform coefficients are created by quantizing the TUs 210. Transform coefficients 212 can be significant or insignificant. FIG. 10 shows a significance map 1002 of the transform coefficients 212. Insignificant transform coefficients 212 can have a quantized value of zero, while significant transform coefficients 212 can have a quantized value that is a positive or negative non-zero value. In some embodiments, significant transform coefficients 212 can also be known as non-zero quantized transform coefficients 212. If a TU 210 comprises one or more significant transform coefficients 212, the coordinates of the last significant transform coefficient 212 along a forward zig-zag coding scan from the top left corner of the TU 210 to the lower right corner of the TU 210, as shown in FIG. 10, can be coded. In alternate embodiments, the significant transform coefficients 212 can be scanned along an inverse wavefront scan, inverse horizontal scan, inverse vertical scan, or any other scan order. In some embodiments, these coordinates can be coded as the syntax elements "last_significant_coeff_y" and "last_significant_coeff_x." By way of a non-limiting example, FIG. 10 depicts the position of the last significant transform 212b within a TU 210 which is being coded in block 902 of FIG. 9.

At block 904 in FIG. 9, the significance map 1002 can be coded to indicate the positions of each of the significant transform coefficients 212 in the TU 210. A significance map 1002 can comprise a binary element for each position in the TU 210. The binary element can be coded as "0" to indicate that the transform coefficient 212 at that position is not significant. The binary element can be coded as "1" to indicate that the transform coefficient 212 at that position is significant.

The quantized transform coefficients 212 of the TUs 210 can be divided into groups. In some embodiments, the groups can be square blocks of quantized transform coefficients 212 called sub-blocks. The sub-blocks within a TU 210 can be subdivisions of any desired size, such as 4×4 block of 16 quantized transform coefficients 212. By way of non-limiting examples: an 8×8 TU 210 having 64 quantized transform coefficients 212 can be divided into four 4×4 sub-blocks each having 16 quantized transform coefficients 212; a 16×16 TU 210 having 256 quantized transform coefficients 212 can be divided into 16 4×4 sub-blocks each having 16 quantized transform coefficients 212; and a 32×32 TU 210 having 1024 quantized transform coefficients 212 can be divided into 64 4×4 sub-blocks each having 16 quantized transform coefficients 212. In other embodiments, the groups can be subsets. Subsets can comprise 16 quantized transform coefficients 212 that are consecutive along a backwards zig-zag scan. In alternate embodiments, groups can comprise any number of quantized transform coefficients 212 from a TU 210 in any scan order and/or shape.

Figures 11, 12:
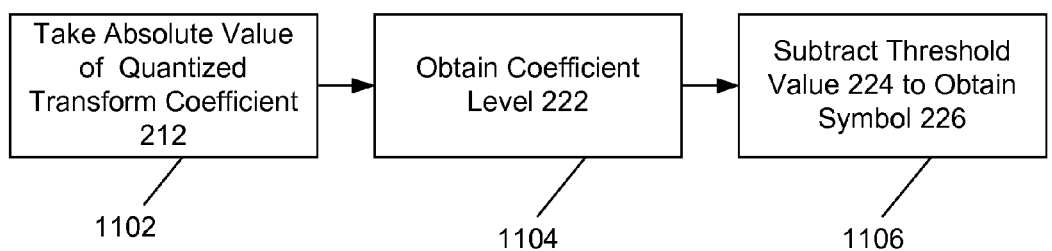
FIG. 11 depicts an embodiment of a method of obtaining coefficient levels and symbols for transform coefficients.
FIG. 12 depicts exemplary embodiments of maximum symbol values for associated parameter variable values of 0, 1, 2, and 3.

Referring back to FIG. 9 in the last block 906, each quantized transform coefficient 212 in each group within the TU 210 can be coded into binary values to obtain final compression bits 214 shown in FIG. 6, including coding for significant coefficient levels. The absolute value of each quantized transform coefficient 212 can be coded separately from the sign of the quantized transform coefficient 212. FIG. 11 illustrates coding steps that deal with taking an absolute value of the quantized transform coefficients. As shown in FIG. 11, at 1102 the absolute value of each quantized transform coefficient 212 can be taken to enable obtaining the coefficient level 222 for that quantized transform coefficient 212 at block 1104. In some embodiments, the positive or negative sign of non-zero coefficient levels 222 can be coded separately.

The coefficient levels 222 obtained at block 1104 that are expected to occur with a higher frequency can be coded before coefficient levels 222 that are expected to occur with lower frequencies. By way of a non-limiting example, in some embodiments coefficient levels 222 of 0, 1, or 2 can be expected to occur most frequently. Coding the coefficient levels 222 in three parts can identify the most frequently occurring coefficient levels 222, leaving more complex calculations for the coefficient levels 222 that can be expected to occur less frequently. In some embodiments, this can be done by coding the coefficient levels 222 in three parts. First, the coefficient level 222 of a quantized transform coefficient 212 can be checked to determine whether it is greater than one. If the coefficient level 222 is greater than one, the coefficient level 222 can be checked to determine whether it is greater than two.

At 1106 in FIG. 11, if the coefficient level 222 is greater than two, the coefficient level 222 can be subtracted by a threshold value 224 of three to obtain a symbol 226. By way of a non-limiting example, in some embodiments, the coefficient level 222 can be coded as three variables:

"coeff_abs_level_greater1_flag," "coeff_abs_level_greater2_flag," and "coeff_abs_level_minus3." For quantized transform coefficients 212 with a coefficient level 222 of two or more, "coeff_abs_level_greater_flag" can be set to "1." If "coeff_abs_level_greater1_flag" is set to "1" and the quantized transform coefficient 212 also has a coefficient level 222 of three or more, "coeff_abs_level_greater2_flag" can be set to "1." If "coeff_abs_level_greater2_flag" is set to "1," the threshold value 224 of three can be subtracted from the coefficient level 222 to get the quantized transform coefficient's symbol 226, coded as "coeff_abs_level_minus3." In alternate embodiments, the coefficient level 222 can be coded in a different number of parts, and/or the threshold value 224 can be an integer other than three.

For the quantized transform coefficients 212 that occur less frequently and have coefficient levels 222 of three or more as determined in the blocks of FIG. 11, the quantized transform coefficient's symbol 226 can be converted to a binary codeword 228 that can be part of the final compression bits 214 generated as shown in FIG. 6. The conversion to a binary codeword 228 can be performed with Truncated Rice code alone, or with a combination of Truncated Rice code and exponential-Golomb (Exp-Golomb) code. The Truncated Rice code can obtain a binary codeword 228 based a parameter variable 230 and the symbol 226. Each symbol 226 can be coded by scanning through each sub-block, subset, or other group within a TU and converting each symbol 226 of the group in order according to the value of the parameter variable 230, and then moving to the symbols 226 of the next group. In some embodiments, the current scanning position can be denoted by "n."

Referring to FIG. 12 and subsequent figures, the parameter variable 230 can be a global variable that can be updated as each symbol 226 is coded. The parameter variable 230 can control the flatness of the codeword distribution. In some embodiments, the parameter variable 230 can be any integer between 0 and N. By way of a non-limiting example, in some embodiments N can be 3, such that the parameter variable 230 can be 0, 1, 2, or 3. In some embodiments, the parameter variable 230 can be denoted as "cRiceParam" as illustrated in FIG. 12 as well as FIG. 13 and subsequent figures.

Referring still to FIG. 12, each parameter variable 230 can have an associated maximum symbol value 232 that denotes the truncation point for the Truncated Rice code. In some embodiments, the maximum symbol value 232 for a particular parameter variable 230 can be denoted as "cTRMax" 232, as illustrated in FIG. 12 which depicts an exemplary table of maximum symbol values 232 "cTRMax" for each value of the parameter variable 230 "cRiceParam." The table of FIG. 12 is labeled as Table 1, as it provides a first listing of values for the cRiceParam parameter variable 230 relative to the cTRMax maximum value symbols 232. If the symbol 226 is less than or equal to the maximum symbol value 232 for the current value of the parameter variable 230, the symbol 226 can be converted into a binary codeword 228 using only Truncated Rice code. If the symbol 226 is greater than the maximum symbol value 232 for the current value of the parameter variable 230, the binary codeword 228 can be generated using a combination of the Truncated Rice code and Exp-Golomb code, with the Truncated Rice codeword for the maximum symbol value 232 being concatenated with the Exp-Golomb code for the symbol 226 minus the maximum symbol value 232 minus one. By way of a non-limiting example, FIG. 13 depicts an exemplary table of binary codewords 228 generated based on symbols 226 and parameter variables 230. Since FIG. 13 provides a second table listing cRiceParam parameter variables 230 relative to other values, it is labeled as Table 2.

In some situations and/or embodiments, converting the symbol 226 according to Truncated Rice code with a lower value for the parameter variable 230 can result in a binary codeword 228 having fewer bits than converting the same symbol 226 according to Truncated Rice code with a higher value for the parameter variable 230. By way of a non-limiting example, as shown by the table depicted in FIG. 13, using a parameter variable 230 value of 0 to convert a symbol 226 of 0 can result in the binary codeword 228 of "0" having 1 bit, while using the parameter variable 230 value of 1 to convert the symbol 226 of 0 can result in the binary codeword 228 of "00" having 2 bits.

In other situations and/or embodiments, converting the symbol 226 according to Truncated Rice code with a higher value for the parameter variable 230 can result in a binary codeword 228 having fewer bits than converting the same symbol 226 according to Truncated Rice code with a lower value for the parameter variable 230. By way of a non-limiting example, as shown in the table depicted in FIG. 13, using a parameter variable 230 value of 0 to convert a symbol 226 of 6 can result in the binary codeword 228 of "1111110" having 7 bits, while using the parameter variable 230 value of 2 to convert the symbol 226 of 6 can result in the binary codeword 228 of "1010" having 4 bits.

Generally referring to FIG. 13, Truncated Rice code with a smaller cRiceParam parameter value 230 can be preferred to code the symbols with smaller codewords, as they need fewer bits to represent. For example, if a symbol 226 has a value of 0, using Truncated Rice code with a cRiceParam parameter value 230 equal to 0, only 1 bit is needed, but 2, 3, or 4 bits are needed when the cRiceParam value is 1, 2, or 3, respectively. If a symbol has a value of 6, using Truncated Rice code with a cRiceParam value equal to 0, 7 bits are needed. But 5, 4, or 4 bits are needed when the cRiceParam value is 1, 2, or 3, respectively.

Figure 14:
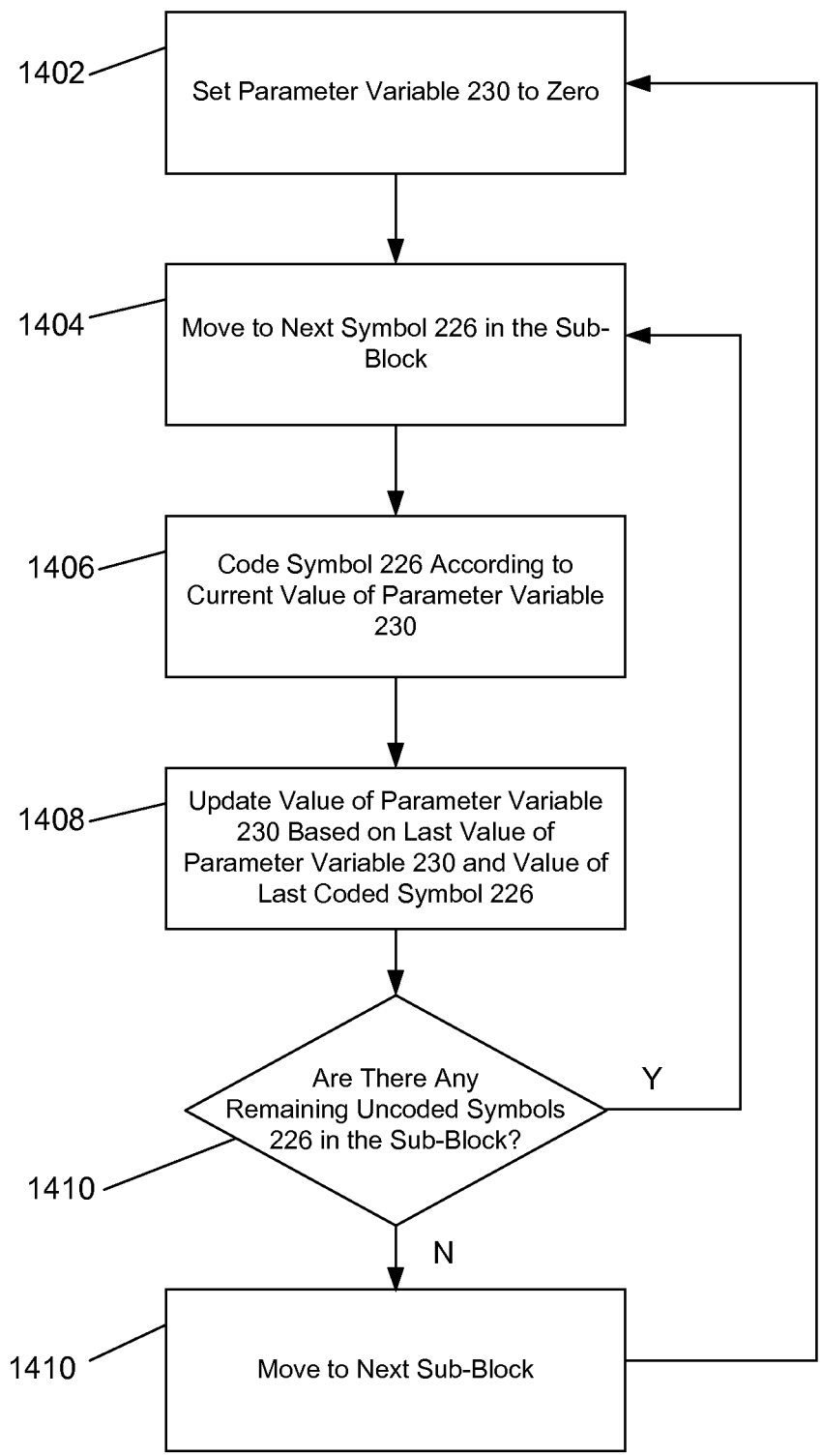
FIG. 14 depicts a flowchart for a method for coding symbols and updating parameter variables.

FIG. 14 is a flow chart depicting a method for entropy coding the symbols 226. At 1402, for each TU 210, the parameter variable 230 can be initially set to a value of zero. At 1404 the coding system 110 can move to the next symbol 226. In some situations and/or embodiments, the next symbol 226 can be the first symbol 226 in the first sub-block, subset, or other group within the TU. At 1406, the symbol 226 can be coded with Truncated Rice and/or Exp-Golomb code using the current value of the parameter variable 230. At 1408, the value of the parameter variable 230 can be updated based on the last value of the parameter variable 230 and the value of the last symbol 226 that was coded. In some situations and/or embodiments, the updated value of the parameter variable 230 can be the same as the last value of the parameter variable 230. In other situations and/or embodiments, the updated value of the parameter variable 230 can be greater than the last value of the parameter variable 230. The parameter variable 230 can be updated based upon calculations or upon values derived from a table as described herein subsequently.

At 1410, after the parameter variable 230 has been updated at 1408, if any symbols 226 remain uncoded in the sub-block, subset, or other group, the coding system 110 can return to 1404 and move to the next symbol 226 in the group. The next symbol 226 can then be coded at 1406 using the updated value of the parameter variable 230 and the process can repeat for all remaining symbols 226 in the group. If no symbols 226 remain uncoded in the group at 1410, the coding system 110 can move to the next group at 1412, return to 1402 and reset the parameter variable 230 to zero, and repeat the process to code the symbols 226 in the next group. In some embodiments, the parameter variable cRiceParam 230 can be reset once per group with an initial "0" value. For a TU with more than one group of quantized transform coefficients 212, the cRiceParam parameter variable 230 for coeff_abs_level_minus3 symbols 226 can be reset to 0 for each group, which can favor smaller symbol value coding. In other embodiments, the cRiceParam parameter variable 230 can be reset to 0 for each TU and/or each subset, sub-block, or other group of transform coefficients 212. In still other embodiments, the step of resetting to the parameter variable 230 to zero can be omitted.

Referring to FIG. 15 and subsequent figures, the cRiceParam parameter variable 230 can be derived and updated based on a table 1504 as follows. In some embodiments, the parameter variable 230 can be updated by performing a table lookup from a low complexity update table 1504 based on the last value of the parameter variable 230 and the value of the last coded symbol 226. For a TU sub-block or other group, the cRiceParam 230 can be initially set to 0, and can be updated for each symbol 226 in the group based on the previous value of the parameter variable 230 "cRiceParam" and the value of the symbol 226 "coeff_abs_level_minus3[n−1]" according a table, for example the table shown in FIG. 15. Because FIG. 15 shows a third table listing symbol values 226 relative to cRiceParam parameter values 230, the table is labeled as Table 3.

Tables 1-3, shown in FIGS. 12, 13, and 15, can be used to update the value of the parameter variable 230 as each symbol is scanned and converted into a binary codeword 228. The Truncated Rice portions of the binary codewords 228 generated with these tables can have a size of up to 12 bits, as can be seen from FIG. 13. Because each codeword can potentially have 12 bits, it can take 2 bytes of eight bits each to store each codeword in memory. The total memory needed to store the codewords of Table 2, as shown in FIG. 12, would be 294 bytes, based on: 18 bytes used to store the 9 codewords associated with the cRiceParam parameter variable 230 value of 0 in the first column; 44 bytes used to store the 22 codewords associated with the cRiceParam parameter variable 230 value of 1 in the second column; 88 bytes used to store the 44 codewords associated with the cRiceParam parameter variable 230 value of 2 in the third column; and 144 bytes used to store the 72 codewords associated with the cRiceParam parameter variable 230 value of 3 in the fourth column.

Referring to FIG. 16 and subsequent figures, in other embodiments binary codewords having a predefined maximum number of bits for the Truncated Rice portion of a codeword 228 can be used to preserve memory space. By way of a non-limiting example, the predefined maximum number of bits for the Truncated Rice portion of the codeword 228 can be set at 8 bits, thereby allowing the Truncated Rice portion of the codeword 228 to be stored in a single byte of 8 bits. In some embodiments, different predefined maximum numbers of bits can be set for codewords 228 that have only a Truncated Rice portion and for codewords 228 that have both Truncated Rice portions and Exp-Golomb portions. By way of a non-limiting example, in some embodiments codewords 228 that have only a Truncated Rice portion can have a maximum of 8 bits; while codewords 228 that have a Truncated Rice portion concatenated with an Exp-Golomb portion can have their Truncated Rice portion capped at 4 bits. The predefined maximum number of bits for the Truncated Rice portion of the codeword 228 can be 8 bits, 7 bits, 5 bits, 4 bits, 3 bits, or any other desired number of bits.

In some embodiments, generating codewords 228 with a Truncated Rice portion having a predefined maximum number of bits can be achieved by allowing one or more additional values for the "cRiceParam" parameter variable 230 beyond the values listed in Table 1. As stated above, the parameter variable 230 can be any integer between 0 and N. By way of a non-limiting example, in some embodiments N can be 4, such that the parameter variable 230 can be 0, 1, 2, 3, or 4.

Table 4, as shown in FIG. 16, depicts an exemplary table of parameter variables 230 values in relation to their maximum symbol values 232. In this embodiment, by using maximum symbol values 232 equal to or lower than those shown in Table 1 in combination with an extra possible parameter variable 230 value of 4, the truncation points for the Truncated Rice code can be such that the Truncated Rice portion of the codewords 228 have a maximum of 8 bits. Table 5, as shown in FIG. 17, depicts a table of the codewords 228 generated using the maximum symbol values 232 of Table 4. Table 5 includes an additional column when compared to Table 2 due to the inclusion of the additional parameter variable value of 4, as seen in Table 4.

As can be seen from Table 5, the Truncated Rice portions of the codewords 228 can have eight or fewer bits, such that the Truncated Rice portion can be stored in a single byte. By way of non-limiting examples, as shown in Table 5 in FIG. 17, the codeword for a symbol of "4" using a parameter variable value of "0" is "11110," a 5 bit codeword having only a Truncated Rice portion less than 8 bits. By way of another non-limiting example, the codeword for a symbol of "8" using a parameter variable value of "0" is "11111111, EG0," a 9 bit codeword having a Truncated Rice portion and an Exp-Golomb portion in which the Truncated Rice portion has the maximum 8 bits.

In comparison with the 294 bytes needed to store to the Truncated Rice components of the codewords of Table 2, the total memory needed to store the Truncated Rice portions of the codewords of Table 5 is a smaller 181 bytes. Table 5 can be stored in 181 bytes based on: 9 bytes used to store the 9 codewords associated with the cRiceParam parameter variable 230 value of 0 in the first column; 16 bytes used to store the 16 codewords associated with the cRiceParam parameter variable 230 value of 1 in the second column; 28 bytes used to store the 28 codewords associated with the cRiceParam parameter variable 230 value of 2 in the third column; 48 bytes used to store the 48 codewords associated with the cRiceParam parameter variable 230 value of 3 in the fourth column; and 80 bytes used to store the 80 codewords associated with the cRiceParam parameter variable 230 value of 4 in the fifth column.

Figure 18:
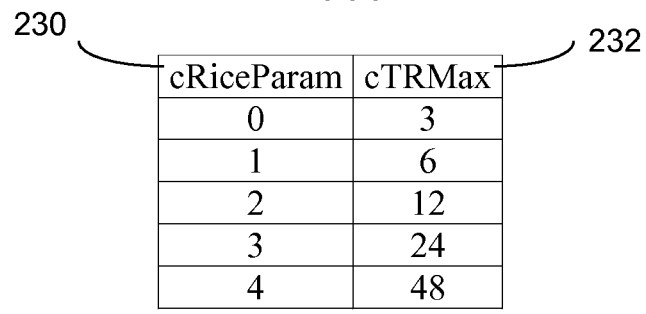
FIG. 18 depicts a second exemplary embodiment of maximum symbol values for associated parameter variable values of 0, 1, 2, 3, and 4.

As discussed above, in some embodiments a first predefined maximum number of bits can be set for those codewords 228 that have only a Truncated Rice portion, and a second predefined maximum number of bits can be set for those codewords 228 that have only a Truncated Rice portion. Tables 6 and 7 illustrate a non-limiting example in which the predefined maximum number of bits for codewords 228 having only a Truncated Rice portion can be 8 bits, and the predefined number of bits for the Truncated Rice portion of codewords that have the Truncated Rice portion concatenated with an Exp-Golomb portion can be 3 bits. Table 6, as shown in FIG. 18, depicts an exemplary table of parameter variables 230 values in relation to their maximum symbol values 232. Table 7, as shown in FIG. 19, depicts a table of the codewords 228 generated using the maximum symbol values 232 of Table 6. In some embodiments a symbol 226 that is less than the maximum symbol value 232 for a particular value of the parameter variable 230 can be converted into a codeword 228 that has only a Truncated Rice portion, and a symbol 226 that is equal to or exceeds the maximum symbol value 232 for that particular value of the parameter variable 230 can be converted into a codeword having both a Truncated Rice portion and an Exp-Golomb portion. In Table 7, codewords 228 having only a Truncated Rice portion do not include a comma, while codewords 228 that have both Truncated Rice and Exp-Golomb portions are shown with the Truncated Rice portion to the left of the comma and the Exp-Golomb portion to the right of the comma. As can be seen from Table 7, the codewords 228 having only Truncated Rice portions have less than the first predefined maximum number of 8 bits, while the codewords 288 having both Truncated Rice and Exp-Golomb portions have the Truncated Rice portion set to "111," equal to the second predefined maximum number of 3 bits.

FIG. 20 depicts Table 8, an exemplary embodiment of an updating table 1504 that can be used to generate codewords 228 using the possible values of 0, 1, 2, 3, or 4 for the parameter variable 230. In some embodiments, referring back to FIG. 14, the updating of the parameter variable 230 at 1408 can be determined from a comparison equation 1506 rather than looking up the new value for the parameter variable 230 from a table such as Table 8. In the comparison equation 1506, it can be determined whether both the last value of the parameter variable 230 and the value of the last coded symbol 226 meet one or more conditions 1502, as illustrated in FIG. 21. In some embodiments, the value of the last coded symbol 226 can be denoted as "coeff_abs_level_minus3[n−1]" as it was in Tables 3 and 8. In other embodiments, the value of the last coded symbol 226 can be denoted as "cLastSE" or by any other desired name. The parameter variable 230 can be updated depending on which conditions 1502 are met, and the value of the current symbol 226 can then be coded based on the updated parameter variable 230 using Truncated Rice code and/or Exp-Golomb Code, for example using a table such as Tables 2, 5, or 7.

In some embodiments, each condition 1502 can comprise two parts, a conditional symbol threshold and a conditional parameter threshold. In these embodiments, the condition 1502 can be met if the value of the symbol 226 is equal to or greater than the conditional symbol threshold and the parameter variable 230 is equal to or greater than the conditional parameter threshold. In alternate embodiments, each condition 1502 can have any number of parts or have any type of condition for either or both the symbol 226 and parameter variable 230. In some embodiments, the parameter variable 230 can be incremented by one for each condition 1502 that is met. By way of a non-limiting example, an integer of one can be mathematically added to the previous value of the parameter variable 230 for each condition that is satisfied.

Because an updating table, such as Table 8 shown in FIG. 20, can need memory space to store and fetch its data and can require processor cycles to access and use, combination logic such as the comparison equation 1506 of FIG. 21 can be used perform the comparison in place of an updating table 1504, as in some embodiments the combination logic can use fewer processor cycles and/or take less memory space. An example of the combination logic representation that determines the updated cRiceParam parameter variable 230 in the place of Table 8 is shown in FIG. 21.

Figure 22:
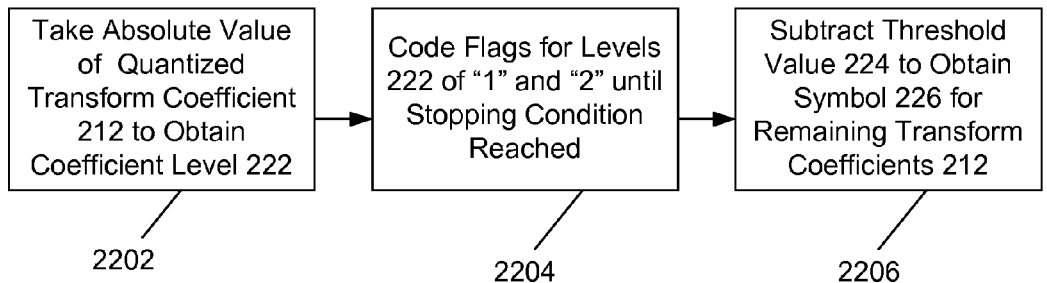
FIG. 22 depicts a first exemplary embodiment of a low complexity updating table with possible parameter variables values of 0, 1, 2, 3, and 4.

FIG. 22 depicts an alternate embodiment of a method for CABAC coding that depicts steps for processing transform coefficients 212, similar to that of FIG. 11. At step 2202, the level 222 of the transform coefficients 212 in a subset, sub-block, or other group can be obtained by taking the absolute value of the transform coefficient 212, similar to steps 1102 and 1104. At step 2204, the flags "coeff_abs_level_greater1_flag" and "coeff_abs_level_greater2_flag" can be coded for non-zero coefficients 212 along the beginning of a scan order only until a stopping condition is reached. By way of non-limiting examples, in one scheme the "coeff_abs_level_greater1_flag" can be coded for each quantized transform coefficient 212 in the sub-block, subset, or other group until two quantized transform coefficients 212 having a level 222 greater than 1 are encountered within the group; and the "coeff_abs_level_greater2_flag" can be coded only for the first quantized transform coefficient 212 having a level 222 greater than two and the "coeff_abs_level_greater1_flag" set to "1" in the group. In another scheme, the "coeff_abs_level_greater1_flag" can be coded for the first N quantized transform coefficients 212 having a non-zero absolute value in the sub-block, subset, or other group; and the "coeff_abs_level_greater2_flag" can be coded only for the first quantized transform coefficient 212 having an absolute value greater than 2 and the "coeff_abs_level_greater1_flag" set to "1" in the group. In other schemes, the stopping condition can be set to be any other condition. In some embodiments, the throughput of the CABAC coefficient level coding can be improved by coding these flags until a stopping condition, instead of coding the flags for all transform coefficients 212 in a group, as in the embodiment shown in FIG. 11.

At 2206, a threshold value 224 can be subtracted from the remaining non-zero quantized transform coefficients 212 to obtain a symbol 226. In these embodiments, the symbol 226 can be denoted as "coeff_abs_level_remaining." By way of non-limiting examples, in some embodiments a threshold value 224 of "3" can be subtracted, such that the "coeff_abs_level_remaining" symbol 226 is "coeff_abs_level_minus3," as discussed above with respect to step 1106. In other embodiments, a threshold value of "2" can be subtracted such that the "coeff_abs_level_remaining" symbol 226 is "coeff_abs_level_minus2," or a threshold value of "1" can be subtracted such that the "coeff_abs_level_remaining" symbol 226 is "coeff_abs_level_minus1."

Figure 23:
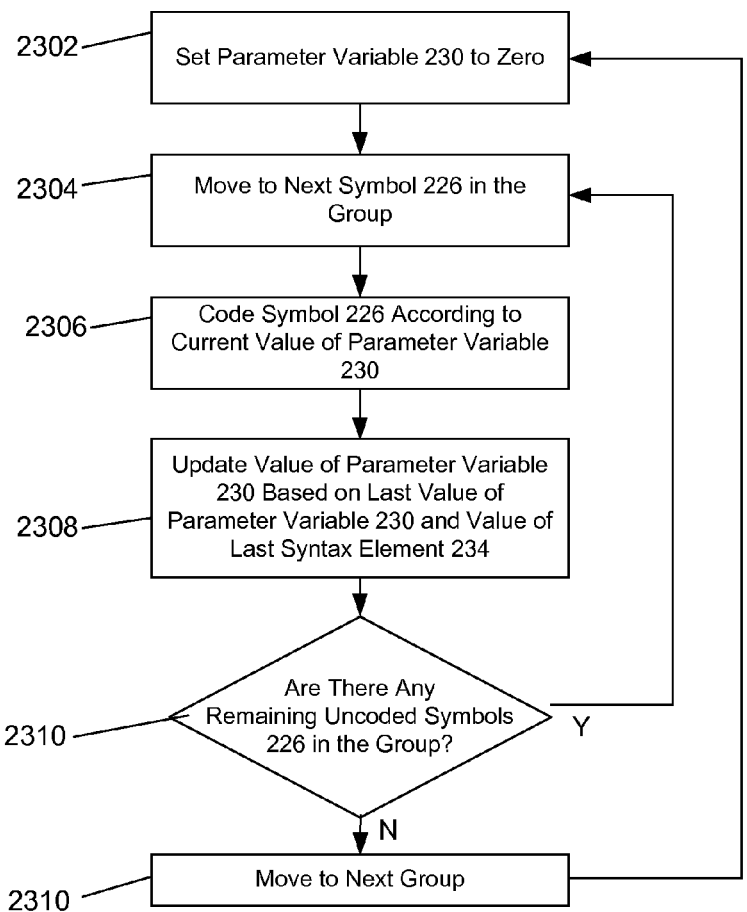
FIG. 23 depicts a first exemplary embodiment of a combination logic representation of conditions for updating a parameter variable with possible parameter variables values of 0, 1, 2, 3, and 4.

After the stopping condition has been reached, the remaining symbols 226 "coeff_abs_level_remaining" in the subset, sub-block, or other group can be converted into binary codewords 228 using the steps shown in FIG. 14 and/or FIG. 23. The conversion of the symbols 226 ""coeff_abs_level_remaining" can be based in part on the value of a parameter variable 230 that is updated using a table 1504 or combination logic comparison equation 1506, as discussed above. As shown in FIG. 23, in some embodiments, the value of the parameter variable 230 can be updated according to a syntax element 234 of the last symbol 226 to be converted into a codeword 228 prior to updating the value of the parameter variable 230. The last syntax element 234 can in some embodiments be denoted as "cLastSE." In some embodiments, the last syntax element 234 "cLastSE" can be the level 222 of the transform coefficient 212, for example the absolute value of the transform coefficient 212. In other embodiments, the last syntax element 234 "cLastSE" can itself be the symbol 226, for example coeff_abs_level_remaining, coeff_abs_level_minus3, coeff_abs_level_minus2, or coeff_abs_level_minus1.

At 2302, the "cRiceParam" parameter variable 230 can be set to an initial value of zero for the subset, sub-block, or other group. At 2304, the first and/or next symbol 226 on a scan order can be processed. At 2306, that symbol 226 can be converted into a binary codeword 228 using Trancated Rice and/or Exponential Golomb, according to the value of the parameter variable 230. For example, the symbol 226 can be converted into a codeword 228 using Tables 2, 5, or 7.

At 2308, after each symbol 226 is coded, the value of the "cRiceParam" parameter variable 230 can be updated, based on the value of the parameter variable 230 before the updating, and the value of the syntax element 234 "cLastSE" for the most recently converted symbol 226. As discussed above, in some embodiments the "cLastSE" last syntax element 234 can be the same as the symbol 226, while in other embodiments the "cLastSE" last syntax element 234 can be the "coeff_abs_level_remaining" value. By way of a non-limiting example, Table 9, as shown in FIG. 24, can be used to update the value of the "cRiceParam" parameter variable 230 using the value of the "cLastSE" last syntax element 234 and the updated value of the parameter variable 230. If any remaining uncoded symbols in the subset, sub-block, or other group are found at step 2310, the system can return to 2304, move to the next symbol 226 in the scan order, and then code that symbol 226 at 2803 according to the updated value of the parameter variable 230 and the value of the "cLastSE" last syntax element 234. The process can continue until the system moves to the next group of transform coefficients 212 at 2310, at which time the system returns to step 2302 and the value of the "cRiceParam" variable can be reset to zero. In other embodiments, the cRiceParam parameter variable 230 can be reset to 0 for each TU and/or each subset, sub-block, or other group of transform coefficients 212. In still other embodiments, the step of resetting to the parameter variable 230 to zero can be omitted.

The techniques of coding "coeff_abs_level_greater1_flag" and "coeff_abs_level_greater2_flag" only for non-zero coefficients along the beginning of the scan order until a stopping condition is reached, as shown in FIG. 22, and converting the remaining "coeff_abs_level_remaining" symbols 226 into binary codewords 228 as shown in FIG. 23, can be combined with the technique of increasing the number of possible values for the parameter variable 230, as shown in FIGS. 16-19, so that codewords 228 with a predefined maximum number of bits are used. In some embodiments, the combination of these techniques can offer faster and/or more efficient CABAC coding and/or decoding during step 612.

As discussed above tables 1504 and/or combination logic comparison equations 1506 can be used to update the value of the "cRiceParam" parameter variable 230. By way of a non-limiting example, FIG. 25 depicts Table 10, a first exemplary embodiment of an updating table 1504 that can be used to update the value of the parameter variable 230 using the "cLastSE" last syntax element 234, and FIG. 26 depicts a combination logic representation that can be used to update the value of the parameter variable 230 in the place of Table 10. In FIG. 26, the conditional symbol thresholds are set to be equal to or greater than 3, 6, 12, and 24, and the conditional parameter thresholds are respectively set to be equal to zero and equal to or less than 1, 2, and 3.

As additional non-limiting examples, FIG. 27 depicts Table 11, a second exemplary embodiment of an updating table 1504 that can be used to update the value of the parameter variable 230 when the two techniques are used in combination, and FIG. 28 depicts a combination logic representation that can be used to update the value of the parameter variable 230 in the place of Table 11. FIG. 29 depicts Table 12, a third exemplary embodiment of an updating table 1504 that can be used to update the value of the parameter variable 230 when the two techniques are used in combination, and FIG. 30 depicts a combination logic representation that can be used to update the value of the parameter variable 230 in the place of Table 12. FIG. 31 depicts Table 13, a fourth exemplary embodiment of an updating table 1504 that can be used to update the value of the parameter variable 230 when these two techniques are used in combination, and FIG. 32 depicts a combination logic representation that can be used to update the value of the parameter variable 230 in the place of Table 13. Further, it should be noted that although some previous figures, such as Table 3 shown in FIG. 15, Table 8 shown in FIG. 20, and the comparison equation 1506 shown in FIG. 21, were shown using the symbol 226 "coeff_abs_level_minus3," in some embodiments they can alternately use the last syntax element 234 "cLastSE" in the place of the symbol 226 to update the value of the parameter variable 230.

Although the conversion process has been described in detail above, a specific non-limiting example will now be provided in which "coeff_abs_level_remaining" symbols 226 can be converted into binary codewords 228 using Table 7 shown in FIG. 19, and the value of the "cRiceParam" parameter variable 230 can be updated using Table 13 shown in FIG. 29. In this example, the parameter variable 230 can initially be set at a value of zero. A transform coefficient 212 with a "coeff_abs_level_remaining" symbol 226 value of 4 can be converted according to Table 7 into the codeword 111,100, which has a Truncated Rice portion "111" having three bits. Table 13 can then be used to update the value of the "cRiceParam" parameter variable 230, based on the "cLastSE" last syntax element 234 value of the most recently converted symbol 226. In this example, the "cLastSE" last syntax element 234 can be set as the symbol 226, so the "cLastSE" last syntax element 234 can have a value of "4." Following these values, the parameter variable 230 can be updated from "0," the value preceding the updating, to a value of "1," as can be seen from Table 13. In this example, the next "coeff_abs_level_remaining" symbol 226 can have a value of 10, which can be converted into a codeword of "111,1010" using Table 7 with the updated "cRiceParam" parameter variable 230 value of "1." The symbol's "cLastSE" last syntax element 234 value of "10" can be used to update the "cRiceParam" parameter variable 230 from "1" to "2" according to Table 13. This process can continue for all remaining "coeff_abs_level_remaining" symbols 226 in the subset, sub-block, or other group of transform coefficients 212. In other embodiments, a combination logic comparison equation 1506 can be used in place of the table to update the value of the parameter variable 230.

Figure 33:
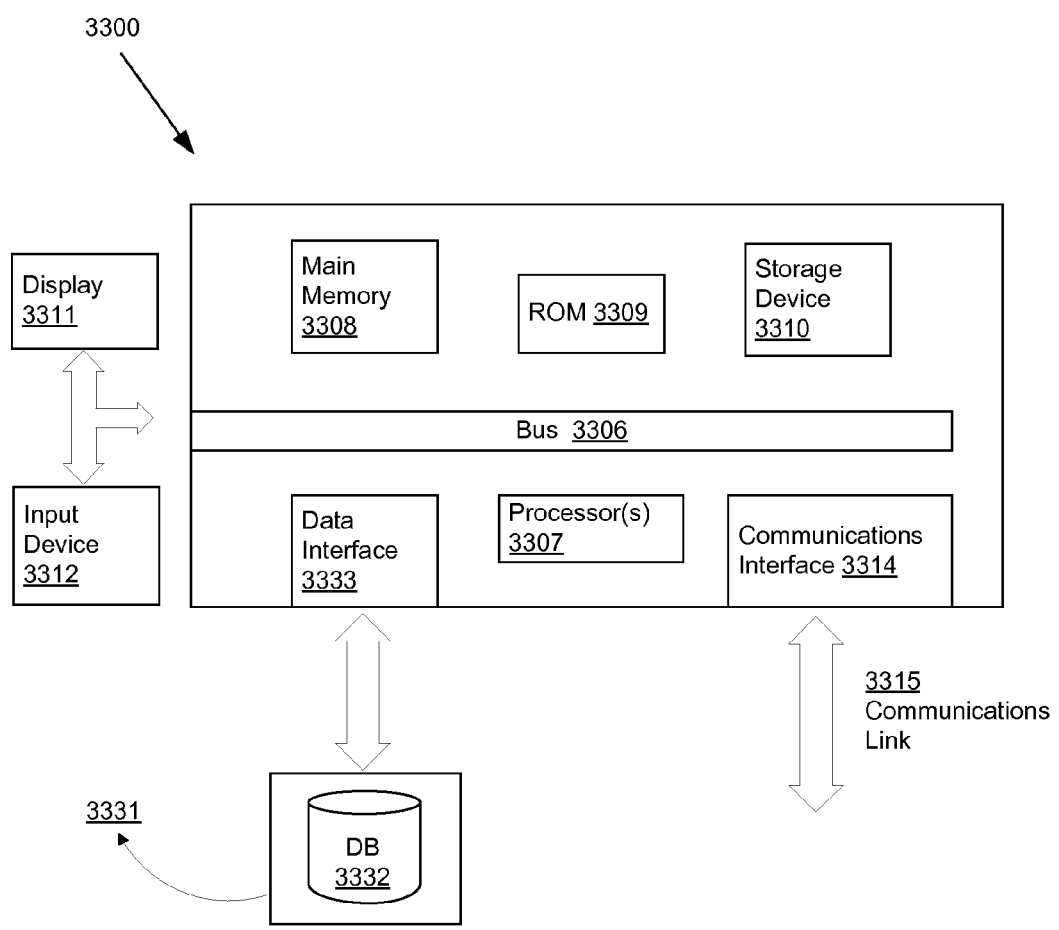
FIG. 33 depicts an exemplary embodiment of computer hardware.

The execution of the sequences of instructions required to practice the embodiments may be performed by a computer system 3300 as shown in FIG. 33. In an embodiment, execution of the sequences of instructions is performed by a single computer system 3300. According to other embodiments, two or more computer systems 3300 coupled by a communication link 3315 may perform the sequence of instructions in coordination with one another. Although a description of only one computer system 3300 may be presented herein, it should be understood that any number of computer systems 3300 may be employed.

A computer system 3300 according to an embodiment will now be described with reference to FIG. 33, which is a block diagram of the functional components of a computer system 3300. As used herein, the term computer system 3300 is broadly used to describe any computing device that can store and independently run one or more programs.

The computer system 3300 may include a communication interface 3314 coupled to the bus 3306. The communication interface 3314 provides two-way communication between computer systems 3300. The communication interface 3314 of a respective computer system 3300 transmits and receives electrical, electromagnetic or optical signals, that include data streams representing various types of signal information, e.g., instructions, messages and data. A communication link 3315 links one computer system 3300 with another computer system 3300. For example, the communication link 3315 may be a LAN, an integrated services digital network (ISDN) card, a modem, or the Internet.

A computer system 3300 may transmit and receive messages, data, and instructions, including programs, i.e., application, code, through its respective communication link 3315 and communication interface 3314. Received program code may be executed by the respective processor(s) 3307 as it is received, and/or stored in the storage device 3310, or other associated non-volatile media, for later execution.

In an embodiment, the computer system 3300 operates in conjunction with a data storage system 3331, e.g., a data storage system 3331 that contains a database 3332 that is readily accessible by the computer system 3300. The computer system 3300 communicates with the data storage system 3331 through a data interface 3333.

Computer system 3300 can include a bus 3306 or other communication mechanism for communicating the instructions, messages and data, collectively, information, and one or more processors 3307 coupled with the bus 3306 for processing information. Computer system 3300 also includes a main memory 3308, such as a random access memory (RAM) or other dynamic storage device, coupled to the bus 3306 for storing dynamic data and instructions to be executed by the processor(s) 3307. The computer system 3300 may further include a read only memory (ROM) 3309 or other static storage device coupled to the bus 3306 for storing static data and instructions for the processor(s) 3307. A storage device 3310, such as a magnetic disk or optical disk, may also be provided and coupled to the bus 3306 for storing data and instructions for the processor(s) 3307.

A computer system 3300 may be coupled via the bus 3306 to a display device 3311, such as an LCD screen. An input device 3312, e.g., alphanumeric and other keys, is coupled to the bus 3306 for communicating information and command selections to the processor(s) 3307.

According to one embodiment, an individual computer system 3300 performs specific operations by their respective processor(s) 3307 executing one or more sequences of one or more instructions contained in the main memory 3308. Such instructions may be read into the main memory 3308 from another computer-usable medium, such as the ROM 3309 or the storage device 3310. Execution of the sequences of instructions contained in the main memory 3308 causes the processor(s) 3307 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed:

1. A method of determining binary codewords for transform coefficients, comprising:

providing a transform unit comprising one or more groups of the transform coefficients, each of the transform coefficients having a quantized value;

coding a first flag for each of the transform coefficients that have an absolute value greater than one until a first condition is reached;

coding a second flag for each of the transform coefficients that have an absolute value greater than two until a second condition is reached;

determining a symbol for each of the remaining transform coefficients for which said first flag and said second flag were not coded, each symbol having an associated syntax element;

providing a parameter variable;

initially setting said parameter variable to a value of zero;

converting each symbol into a binary codeword based on the value of said parameter variable; and updating said parameter variable after each symbol has been converted by setting said parameter variable to a new value, said new value being based at least in part on the value of said parameter variable preceding said updating and the syntax element of the most recently converted symbol, wherein each said binary codeword comprises a Truncated Rice portion having up to a predefined maximum number of bits, and wherein said binary codeword comprises:

said Truncated Rice portion when said symbol is less than or equal to a maximum symbol value for the value of said parameter variable, or said Truncated Rice portion and an Exponential Golomb portion when said symbol is greater than said maximum symbol value for the value of said parameter variable.

2. The method of claim 1, wherein said first condition is reached when two of said transform coefficients having an absolute value greater than one have been encountered in a group.

3. The method of claim 2, wherein said second condition is reached when the first flag for a single transform coefficient has been set to one within a group.

4. The method of claim 1, wherein said first condition is reached when the first flag for a preset number of transform coefficients having an absolute value of one or more have been coded within a group.

5. The method of claim 4, wherein said second condition is reached when the first flag for a single transform coefficient has been set to one within a group.

6. The method of 1, wherein:

said predefined maximum number of bits for said Truncated Rice portion is a first value when said binary codeword comprises said Truncated Rice portion without said Exponential Golomb portion, and said predefined maximum number of bits for said Truncated Rice portion is a second value when said binary codeword comprises said Truncated Rice portion and said Exponential Golomb portion.

7. The method of claim 1, wherein said converting comprises looking up said binary codeword from a table based on the value of said symbol and the value of said parameter variable.

8. The method of claim 1, wherein the value of said parameter variable is configured to be zero, one, two, three, or four.

9. A method of determining binary codewords for transform coefficients, comprising:

providing a transform unit comprising one or more groups of the transform coefficients, each of the transform coefficients having a quantized value;

coding a first flag for each of the transform coefficients that have an absolute value greater than one until a first condition is reached;

coding a second flag for each of the transform coefficients that have an absolute value greater than two until a second condition is reached;

determining a symbol for each of the remaining transform coefficients for which said first flag and said second flag were not coded, each symbol having an associated syntax element;
providing a parameter variable;
initially setting said parameter variable to a value of zero;
converting each symbol into a binary codeword based on the value of said parameter variable; and
updating said parameter variable after each symbol has been converted by setting said parameter variable to a new value, said new value being based at least in part on the value of said parameter variable preceding said updating and the syntax element of the most recently converted symbol,
wherein each said binary codeword comprises a Truncated Rice portion having up to a predefined maximum number of bits, and
wherein updating said parameter variable comprises:
looking up said new value from a table based on the value of said parameter variable preceding said updating and the value of the syntax element of the most recently converted symbol; and
replacing the value of said parameter variable with said new value.

10. The method of claim 1, wherein updating said parameter variable comprises:
determining whether the value of said parameter variable preceding said updating and the value of the syntax element of the most recently converted symbol together satisfy one or more conditions; and
mathematically adding an integer of one to the last value of said parameter variable for each of said one or more conditions that is satisfied.

11. The method of claim 10, wherein each of said one or more conditions comprises a conditional symbol threshold and a conditional parameter threshold.

12. The method of claim 11, wherein one of said one or more conditions is satisfied when the value of the syntax element of the most recently converted symbol is greater than or equal to said conditional symbol threshold for that condition and the value of said parameter variable preceding said updating is less than or equal to said conditional parameter threshold for that condition.

13. The method of claim 12, wherein the conditional symbol thresholds for a set of said one or more conditions are 3, 6, 12, and 24.

14. A video processing system, comprising:
a memory configured to store one or more transform coefficients each having a quantized value;
a processor coupled with said memory, said processor being configured to:
code a first flag for each of the transform coefficients that have an absolute value greater than one until a first condition is reached;
code a second flag for each of the transform coefficients that have an absolute value greater than two until a second condition is reached;
determine a symbol for each of the remaining transform coefficients for which said first flag and said second flag were not coded, each symbol having an associated syntax element;
set a parameter variable to an initial value of zero;
convert said symbol to said binary codeword based on the value of said parameter variable; and
update the value of said parameter variable after the symbol has been converted by setting said parameter variable to a new value, said new value being based at least in part on the value of said parameter variable preceding said updating and the syntax element of the most recently converted symbol,
wherein said binary codeword comprises a Truncated Rice portion having up to a predefined maximum number of bits, and
wherein updating said parameter variable comprises:
determining whether the value of said parameter variable preceding said updating and the value of the syntax element of the most recently converted symbol together satisfy one or more conditions; and
mathematically adding an integer of one to the last value of said parameter variable for each of said one or more conditions that is satisfied.

15. The video processing system of claim 14, wherein each of said one or more conditions comprises a conditional symbol threshold and a conditional parameter threshold.

16. The video processing system of claim 15, wherein one of said one or more conditions is satisfied when the value of the syntax element of the most recently converted symbol is greater than or equal to said conditional symbol threshold for that condition and the value of said parameter variable preceding said updating is less than or equal to said conditional parameter threshold for that condition.

17. The video processing system of claim 16, wherein the conditional symbol thresholds for a set of said one or more conditions are 3, 6, 12, and 24.

* * * * *